United States Patent
Kimura

(10) Patent No.: US 7,647,455 B2
(45) Date of Patent: Jan. 12, 2010

(54) INFORMATION PROCESSING APPARATUS AND METHOD, PROGRAM, AND PROGRAM RECORDING MEDIUM

(75) Inventor: Shin Kimura, Kanagawa (JP)

(73) Assignee: Sony Corporation, Tokyo (JP)

( * ) Notice: Subject to any disclaimer, the term of this patent is extended or adjusted under 35 U.S.C. 154(b) by 167 days.

(21) Appl. No.: 11/105,242

(22) Filed: Apr. 13, 2005

(65) Prior Publication Data

US 2005/0235106 A1 Oct. 20, 2005

(30) Foreign Application Priority Data

Apr. 15, 2004 (JP) ............................ 2004-119852
Apr. 15, 2004 (JP) ............................ 2004-119853

(51) Int. Cl.
  G06F 12/00 (2006.01)
  G06F 13/00 (2006.01)
  G06F 13/28 (2006.01)
(52) U.S. Cl. ....................... 711/151; 711/156; 711/158; 710/40
(58) Field of Classification Search ........................ None
  See application file for complete search history.

(56) References Cited

U.S. PATENT DOCUMENTS

| 5,901,334 | A | 5/1999 | Banks et al. |
| 5,978,815 | A | 11/1999 | Cabrera et al. |
| 6,347,344 | B1* | 2/2002 | Baker et al. .................... 710/20 |
| 6,671,784 | B2* | 12/2003 | Lee ............................. 711/151 |
| 7,272,852 | B2* | 9/2007 | Honda et al. ................... 726/10 |
| 2002/0083251 | A1* | 6/2002 | Chauvel et al. ............. 710/240 |
| 2004/0068625 | A1* | 4/2004 | Tseng et al. ................. 711/151 |
| 2005/0005034 | A1* | 1/2005 | Johnson ......................... 710/6 |
| 2005/0204097 | A1* | 9/2005 | Kistler et al. ................ 711/114 |

FOREIGN PATENT DOCUMENTS

| JP | 1 112460 | 5/1989 |
| JP | 1 276938 | 11/1989 |
| JP | 3 22156 | 1/1991 |
| JP | 5 143411 | 6/1993 |
| JP | 6 44164 | 2/1994 |
| JP | 7 325669 | 12/1995 |
| JP | 8 171526 | 7/1996 |
| JP | 8 511120 | 11/1996 |

(Continued)

*Primary Examiner*—Christian P Chace
*Assistant Examiner*—Chad L Davidson
(74) *Attorney, Agent, or Firm*—Frommer Lawrence & Haug LLP; William S. Frommer

(57) ABSTRACT

An information processing apparatus for processing an access request to access a recording medium from an application includes the following elements. A setting unit sets a priority unique to the access request from the application or permission information indicating whether or not processing on the access request from the application is permitted. A queue controller stores the access request provided with the priority or the permission information in a queue. An access request processor processes the access request stored in the queue according to the priority or the permission information.

29 Claims, 25 Drawing Sheets

FOREIGN PATENT DOCUMENTS

| | | |
|---|---|---|
| JP | 9 244931 | 9/1997 |
| JP | 10 275059 | 10/1998 |
| JP | 2000 89998 | 3/2000 |
| JP | 2000 148401 | 5/2000 |
| JP | 2000 172570 | 6/2000 |
| JP | 2001 142649 | 5/2001 |
| JP | 2001 306263 | 11/2001 |
| JP | 2002 108797 | 4/2002 |
| JP | 2002 298551 | 10/2002 |
| JP | 2004 104212 | 4/2004 |
| JP | 2005 301853 | 10/2005 |
| JP | 2005 302221 | 10/2005 |

* cited by examiner

FIG. 7

PdGetPriority
- IRP/FastIO-processed priority having process ID specified in PD_Filter Layer is get.
- bool PdGetPriority(
    unsigned long processID;
    long *irpPriority;         //0 – 31  31: highest priority, 0: lowest priority
  );
  return value: if succeeded, true (1) is returned.
                if failed, false (0) is returned.

PdSetPriority
- IRP/FastIO-processed priority having process ID specified in PD_Filter Layer is changed.
- bool PdSetPriority(
    unsigned long processed;
    long irpPriority;          //0 – 31  31: highest priority, 0: lowest priority
  );
  return value: if succeeded, true (1) is returned.
                if failed, false (0) is returned.

FIG. 8

IOCTL_PD_SET_PROCESSID

Process ID of process to load PD_API.DLL is registered in PD_FILTER.
It can be determined in the PD_FILTER layer whether the process is the process that has loaded PD_API.DLL or another process.
IOCTL code is issued when PD_API.DLL is loaded.

IOCTL_PD_DELETE_PROCESSID

Process ID of process to load PD_API.DLL is deleted from PD_FILTER.
IOCTL code is issued when process is finished.

IOCTL_PD_SET_PRIORITY

IOCTL code issued in PD_API PdSetPriority()

IOCTL_PD_GET_PRIORITY

IOCTL code issued in PD_API PdGetPriority()

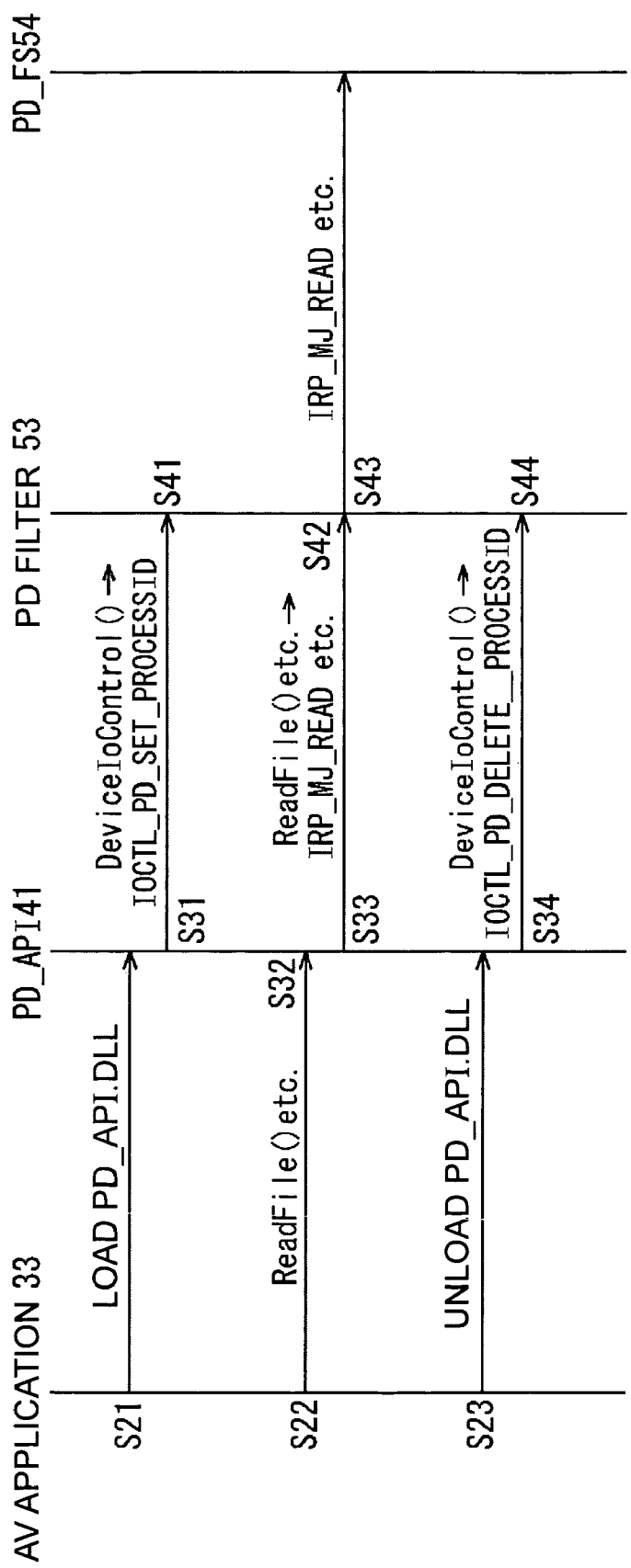

FIG. 12

```
PdPauseOtherAppIrp
 • IRPs/FastIOs of other applications are set in pause state in PD_Filter Layer.
 • bool PdPauseOtherAppIrp(
       char *volumeName,        // Volume Name
       );
   return value: if succeeded, true (1) is returned.
                 if failed, false (0) is returned.
```

```
PdRunOtherAppIrp
 • IRPs/FastIOs of other applications are set in run state in PD_Filter Layer.
 • bool PdRunOtherAppIrp(
       char *volumeName,        // Volume Name
       );
   return value: if succeeded, true (1) is returned.
                 if failed, false (0) is returned.
```

FIG. 13

| IOCTL_PD_PAUSE_OTHERAPPIRP | IOCTL_PD_RUN_OTHERAPPIRP |
|---|---|
| IOCTL code issued in PD_API PdPauseOtherAppIrp() | IOCTL code issued in PD_API PdRunOtherAppIrp() |

FIG. 20

PdOpenFile
- Specified optical disc file is opened to obtain file handle.
- handle PdOpenFile(
    char *fileName,              // Path+FileName
    unsigned long  fileOpenMode, // File Open Mode
    bool cacheFlag=FALSE         //
  );
  return value: if succeeded, file handle is returned.
              if failed, 0xffffffff is returned.

PdCloseFile
- Optical disc file specified by file handle is closed.
- bool PdCloseFile(
    handle fileHandle     // File Handle
  );
  return value: if succeeded, true(1) is returned.
              if failed, false(0) is returned.

PdReadFile
- Data of optical disc file specified by file handle is read by specified size.
- unsigned long PdReadFile(
    handle fileHandle,     // File Handle
    void * buffer,         // buffer for storing read data
    unsigned long count    // number of bytes of data
  );                         to be read
  return value: if succeeded, number of bytes of read data is returned.
              if failed, false(0) is returned.

PdWriteFile
- Specified size of data is written into optical disc file specified by file handle.
- unsigned long PdWriteFile(
    handle fileHandle,     // File Handle
    void * buffer,         // buffer for storing written data
    unsigned long count,   // number of bytes of data
  );                         to be written
  return value: if succeeded, number of bytes of written data is returned.
              if failed, false(0) is returned.

INFORMATION PROCESSING APPARATUS AND METHOD, PROGRAM, AND PROGRAM RECORDING MEDIUM

CROSS REFERENCES TO RELATED APPLICATIONS

The present invention contains subject matter related to Japanese Patent Application JP 2004-1119852 and 2004-1119853 filed in the Japanese Patent Office on Apr. 15, 2004, the entire contents of which are incorporated herein by reference.

BACKGROUND OF THE INVENTION

1. Field of the Invention

The present invention relates to information processing apparatuses and methods, programs, and program recording media. More particularly, the invention relates to an information processing apparatus and method, a program, and a program recording medium in which, for example, audio-visual data (AV data), can be recorded and played back on and from a recording medium in real time.

2. Description of the Related Art

It has been demanded that high bit-rate AV data can be recorded and played back on and from optical discs.

The assignee of the present invention previously proposed in Japanese Unexamined Patent Application Publication No. 2004-005895 a disc drive for recording a plurality of data formats, such as video data and associated audio data, on an optical disc such that they can be recorded periodically and in units of, for example, sectors (without being recorded over adjacent sectors) of the optical disc, and more specifically, such that the boundaries of the video data and the audio data coincide with boundaries of the sectors of the optical disc.

In this disc drive, a certain number of video data or audio data can be collectively recorded on consecutive recording areas on an optical disc, and thus, such data can be read or written without a seek.

Additionally, since video data or audio data can be recorded in units of sectors of an optical disc, video data and audio data are not recorded together in one sector, thereby making it possible to read only video data or audio data. That is, for example, when the user requires only video data or audio data, the required video data or audio data can be read from the optical disc, which enhances the efficiency (speed) in reading only video data (or audio data) compared to when video data and audio data are recorded together in one sector.

SUMMARY OF THE INVENTION

The assignee of the present invention also proposed the following type of disc drive. Among consecutive free areas having at least a predetermined size on an optical disc, a free area adjacent to a recording area on which data has just been recorded is reserved, and then, data is recorded in the reserved space area.

In this case, ideally, a certain string of data can be recorded on consecutive recording areas on the optical disc. Accordingly, data can be recorded or played back without requiring a seek so that high bit-rate AV data can be recorded or played back on or from the optical disc in real time.

The above-described type of disc drive that can record and play back data without requiring a seek is hereinafter referred to as a "professional disc (PD) drive". An optical disc on which data is recorded by the PD drive is hereinafter referred to as a "professional disc (PD)".

Due to faster central processing units (CPUs) and lower prices of large-capacity memory devices, high performance and inexpensive computers are implemented. In such computers, applications (programs) performing processing, for example, editing a large volume of AV data (hereinafter referred to as "AV applications") are also implemented.

There is also an increasing demand to install a PD drive in the computer or to externally connect the PD drive to the computer so that the AV application can access the PD drive to read or write AV data from or into a PD.

In this case, however, there is no guarantee that the AV data can be read or written from or into the PD in real time.

More specifically, in recent computers, generally, a plurality of applications can be executed simultaneously by multitasking operations. More precisely, however, timesharing processing is performed on a plurality of applications. Accordingly, for example, if another application already accesses the PD before the AV application does, an unscheduled seek occurs in the PD drive when the AV application accesses the PD.

Additionally, if another application already accesses the PD when the AV application attempts to access the PD, it may have to wait.

Under the above-described conditions, it may be difficult to read or write AV data from or into the PD in real time.

It is thus desirable to record or play back data on or from a recording medium, such as an optical disc, in real time.

An information processing apparatus according to an embodiment of the present invention processes an access request to access a recording medium from an application. The information processing apparatus includes: setting means for setting a priority unique to the access request from the application or permission information indicating whether or not processing on the access request from the application is permitted; queue control means for storing the access request provided with the priority or the permission information in a queue; and access request processing means for processing the access request stored in the queue according to the priority or the permission information.

The setting means may set a higher priority for an access request from a specific application than a priority for an access request from another application.

The access request processing means may constantly process an access request from a specific application and process an access request from another application only when the permission information indicates that the processing on the access request is permitted.

The information processing apparatus may further include cache function setting means for setting whether or not a cache function is used. The access request processing means may process the access request according to whether or not the cache function is used.

The access request processing means may process an access request from a specific application according to whether or not the cache function is used.

The information processing apparatus may be a filter driver for filtering the access request and delivering the filtered access request to a file system driver.

Data to be read or written from or into the recording medium may include at least audio-visual data.

In recording areas of the recording medium, among consecutive free areas having at least a predetermined size, a free area located closest to a recording area on which data has temporally just been recorded may be reserved and the data may be recorded in the reserved free area.

An information processing method for processing an access request to access a recording medium from an application according to an embodiment of the present invention includes the steps of: setting a priority unique to the access request from the application or permission information indicating whether or not processing on the access request from the application is permitted; storing the access request provided with the priority or the permission information in a queue; and processing the access request stored in the queue according to the priority or the permission information.

A program allowing a computer to process an access request to access a recording medium from an application according to an embodiment of the present invention includes the steps of: setting a priority unique to the access request from the application or permission information indicating whether or not processing on the access request from the application is permitted; storing the access request provided with the priority or the permission information in a queue; and processing the access request stored in the queue according to the priority or the permission information.

A program recording medium according to an embodiment of the present invention records thereon a program allowing a computer to process an access request to access a recording medium from an application. The program includes the steps of: setting a priority unique to the access request from the application or permission information indicating whether or not processing on the access request from the application is permitted; storing the access request provided with the priority or the permission information in a queue; and processing the access request stored in the queue according to the priority or the permission information.

According to an embodiment of the present invention, in response to an access request from an application, a priority unique to the access request or permission information indicating whether or not processing on the access request is permitted is set. The access request provided with the priority or the permission information is stored in a queue. Then, the access request stored in the queue is processed according to the priority or the permission information.

According to an embodiment of the present invention, an access request from a certain application can be preferentially processed, or only an access request from a specific application can be accepted. As a result, data can be recorded or played back in real time.

BRIEF DESCRIPTION OF THE DRAWINGS

FIG. 7 illustrates API functions provided by a PD_API;

FIG. 8 illustrates user-defined IOCTL codes specified by IRP_MJ_DEVICE_CONTROL;

FIG. 9 is a flowchart illustrating processing performed by using the first function;

FIG. 12 illustrates API functions provided by the PD_API;

FIG. 13 illustrates user-defined IOCTL codes specified by IRP_MJ_DEVICE_CONTROL;

FIG. 20 illustrates APT functions provided by the PD_API;

DESCRIPTION OF THE PREFERRED EMBODIMENTS

The present invention is described in detail below with reference to the accompanying drawings through illustration of a preferred embodiment.

Figure 1:
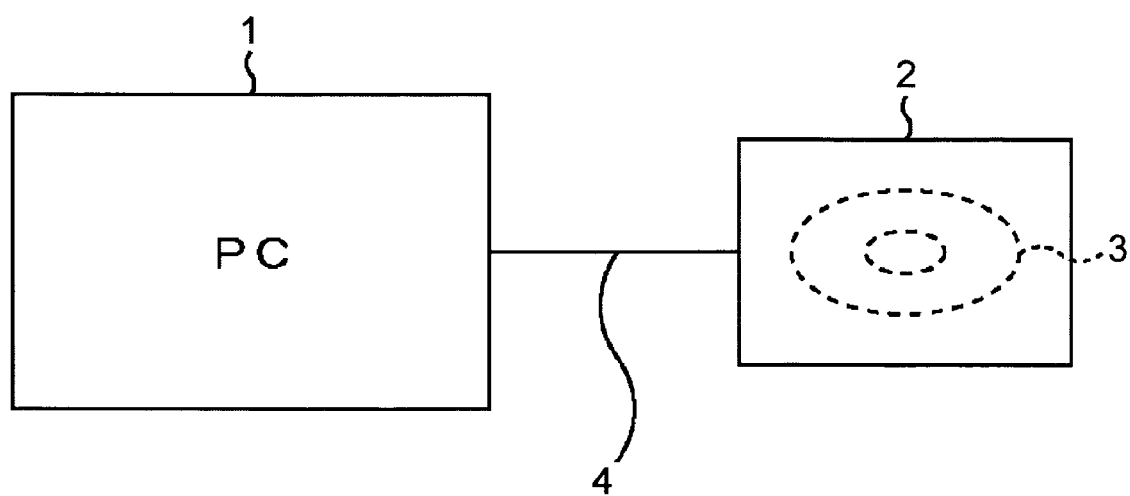
FIG. 1 is a block diagram illustrating an example of the configuration of an information processing system according to an embodiment of the present invention.

An information processing system according to an embodiment of the present invention shown in FIG. 1 includes a personal computer (PC) 1 and a drive 2.

The PC 1 stores an operating system (OS) and applications (programs) therein, and performs various types of processing by executing the applications under The control of the OS.

The drive 2, which is the above-described PD drive, is connected to the PC 1 via a 1394 cable 4. An optical disc 3, which is a PD, can be installed or removed into or from the drive 2 so that the drive 2 can read or write data, for example, AV data, from or into the optical disc 3 by communicating with the PC 1 in compliance with Institute of Electronic and Electronics Engineers (IEEE) 1394 standards.

It is not necessary that the drive 2 is a PD drive and the optical disc 3 is a PD. Additionally, the PC 1 and the drive 2 can communicate with each other according to standards other than the IEEE1394 standards.

Figure 2:
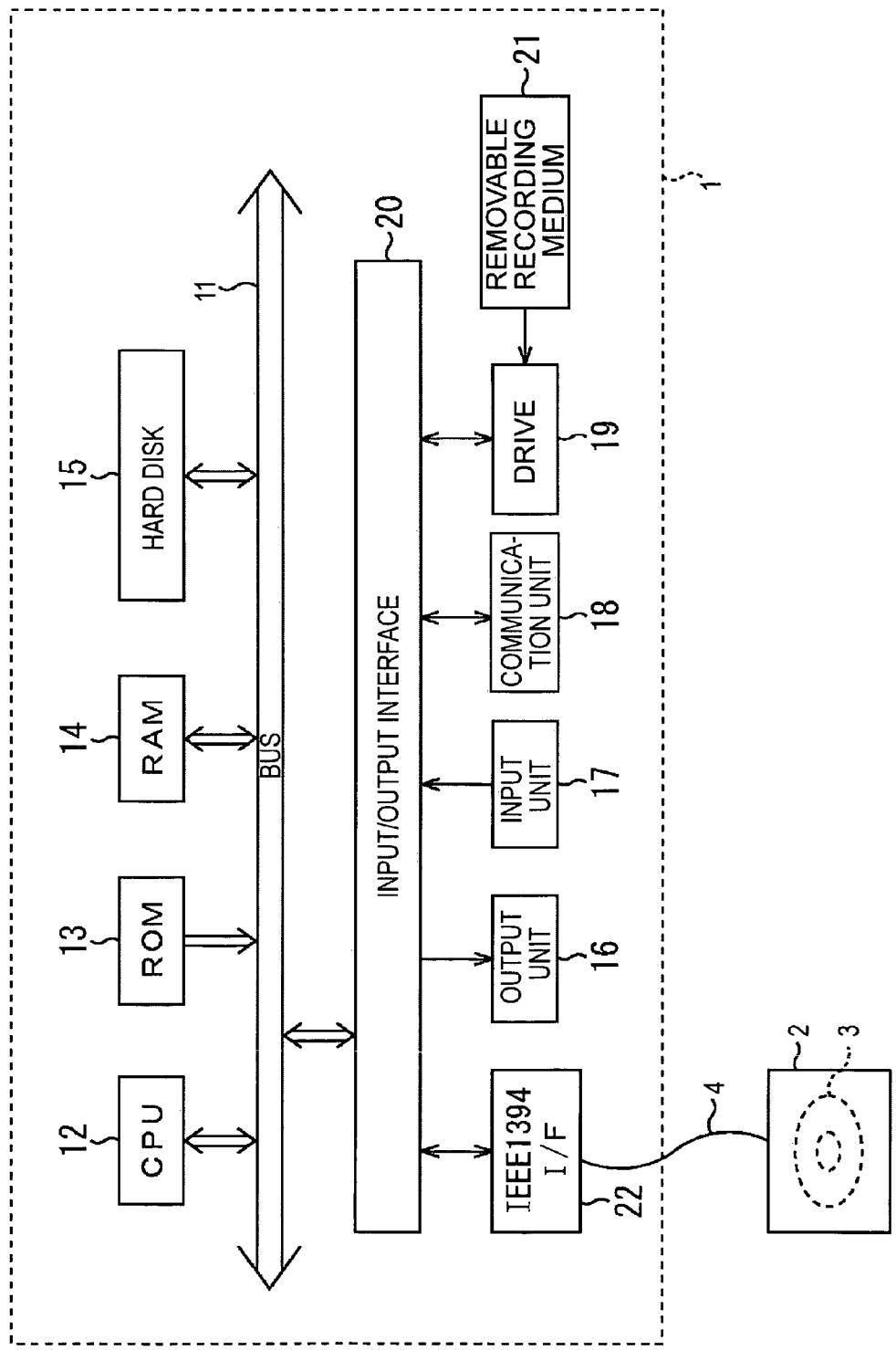
FIG. 2 is a block diagram illustrating an example of the hardware configuration of a personal computer (PC)

FIG. 2 illustrates an example of the hardware configuration of the PC 1.

The PC 1 has a built-in CPU 12. An input/output interface 20 is connected to the CPU 12 via a bus 11. In response to an instruction input from a user by operating an input unit 17 including a keyboard, a mouse, a microphone, etc. via the input/output interface 20, the CPU 12 executes a program stored in a read only memory (ROM) 13. The CPU 12 also executes programs stored in a hard disk 15, programs transferred from a satellite or a network, received by a communication unit 18, and installed into the hard disk 15, and programs read from a removable recording medium 21 in a drive 19, installed into the hard disk 15, and loaded to a random access memory (RAM) 14. The CPU 12 then performs processing according to the flowcharts or the structures of the block diagrams, which are discussed below. Then, the CPU 12 outputs the processing result from an output unit 16 including a liquid crystal display (LCD) or a speaker via the input/output interface 20. Alternatively, the CPU 12 sends the processing result from the communication unit 18 or records it on the hard disk 15 via the input/output interface 20.

In the PC 1, an IEEE1394 interface (I/F) 22 performing communication in compliance with the IEEE1394 standards is connected to the input/output interface 20. The drive 2 is connected to the IEEE1394 interface 22 via the 1394 cable 4. The CPU 12 accesses the drive 2 via the bus 11, the input/output interface 20, the IEEE1394 interface 22, and the 1394 cable 4 to read or write data from or into the optical disc 3 installed in the drive 2.

The CPU 12 executes the OS and various application programs, which can be stored in advance in a recording medium, such as the hard disk 15 or the ROM 13, built in the PC 1.

Alternatively, the programs may be stored (recorded) temporally or permanently in the removable recording medium 21, such as a flexible disk, a compact disc read only memory (CD-ROM), a magneto-optical (MO) disk, a digital versatile disc (DVD), a magnetic disk, or a semiconductor memory. The removable recording medium 21 can be provided as so-called "package software".

As stated above, the programs can be installed from the above-described removable recording medium 21 into the PC 1. Alternatively, the programs may be transferred from a download site to the PC 1 via a digital broadcasting satellite by wireless means or wired means, such as a network, for example, a local area network (LAN) or the Internet. In this case, the PC 1 receives the programs by the communication unit 18 and installs them into the built-in hard disk 15.

Figure 3:
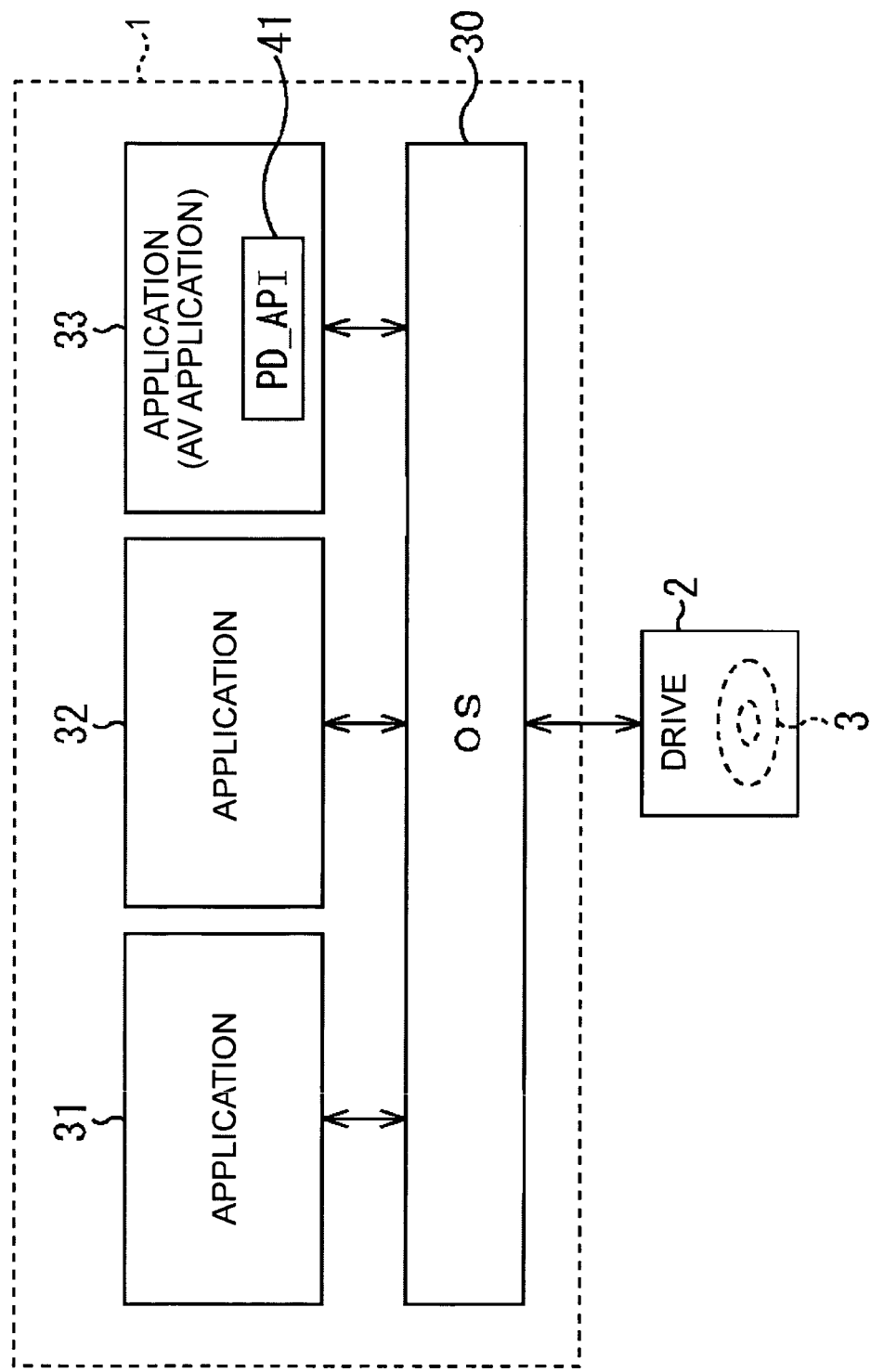
FIG. 3 illustrates a program executed by a CPU.

FIG. 3 illustrates programs executed by the CPU 12 shown in FIG. 2.

For example, at least an OS 30 and applications 31 through 33 are installed in the hard disk 15 shown in FIG. 2. When the PC 1 is powered ON, the CPU 12 loads the OS 30 from the hard disk 15 into the RAM 14 and executes it. In response to a request to start the application 31, 32, or 33 by operating the input unit 17, the CPU 12 loads the corresponding application 31, 32, or 33 from the hard disk 15 into the RAM 14, and executes it under the control of the OS 30.

Then, in response to a request to access the optical disc 3 installed in the drive 2 by the application 31, 32, or 33, the OS 30 processes the access request. In the drive 2, data can be recorded on the optical disc 3 based on the access request from the application 31, 32, or 33. Alternatively, in the drive 2, data can be played back from the optical disc 3 based on the access request from the application 31, 32, or 33, and is delivered to the application 31, 32, or 33 that has made the access request via the OS 30.

The number of applications installed in the hard disk 15 shown in FIG. 2 is not restricted to three, and may be more or less.

It is now assumed that, among the three applications 31, 32, and 33 installed in the hard disk 15, the application 33 reads AV data from an external source, and edits, records, and plays back the AV data. Thus, the application 33 is also referred to as the "AV application 33".

The AV application 33 calls PD_API (PD_API.DLL) 41, which is Dynamic Link Library (DLL), and makes a request to access the optical disc 3 via the PD_API 41. The PD_API 41 is a DLL for providing a unique application program interface (API), which is discussed below, concerning access to the optical disc 3.

As the OS 30, Unix®, Linux, or Windows® by Microsoft Corporation, or another OS, can be used. In this embodiment, a Windows® NT OS, for example, Windows® NT, Windows® 2000, or Windows® XP, is used as the OS 30.

Figure 4:
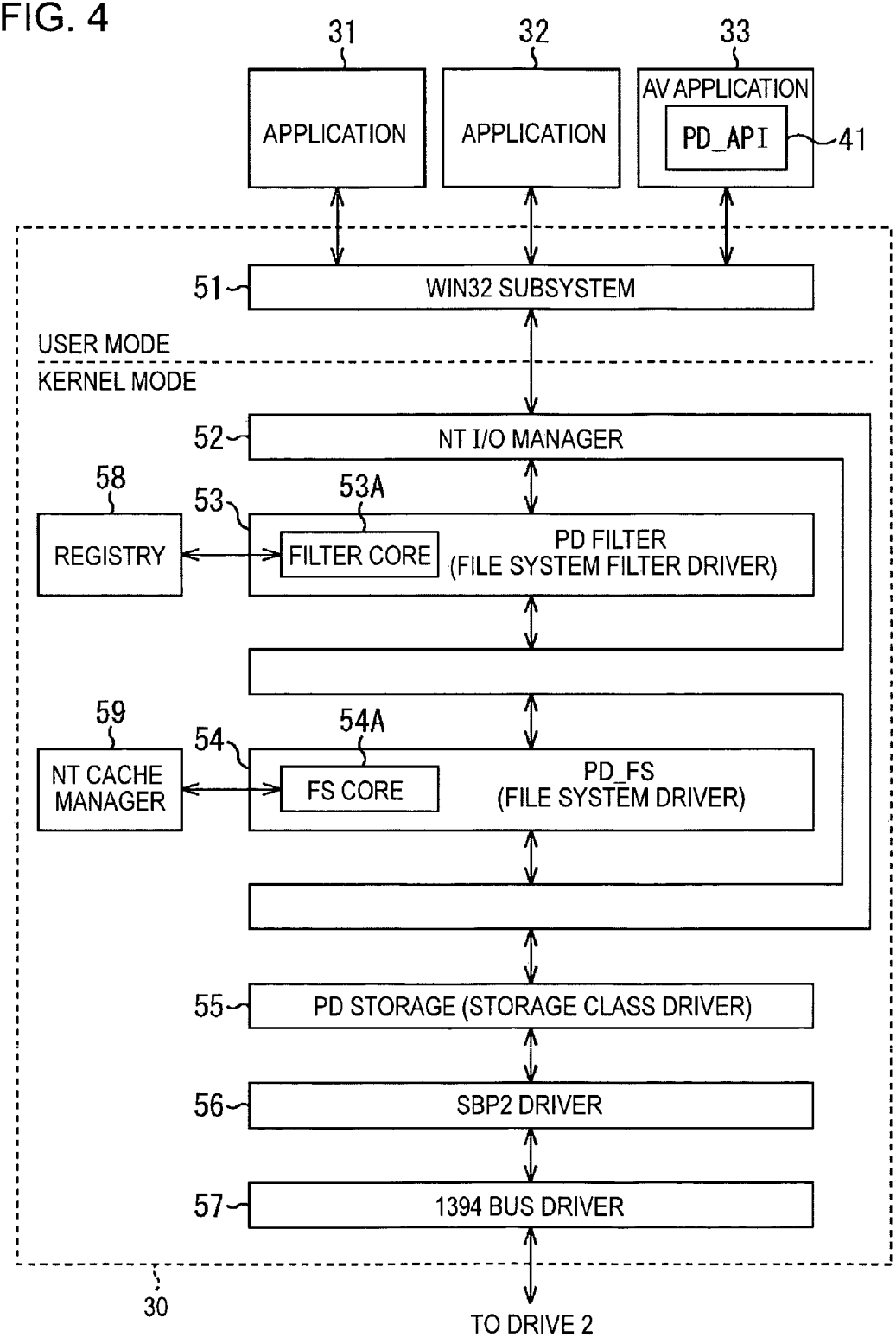
FIG. 4 is a block diagram illustrating an example of the internal configuration (file system) of an operating system (OS)

FIG. 4 illustrates an example of the configuration of the OS 30, i.e., a Windows® NT OS, and more particularly, a portion of the OS 30 related to access to the optical disc 3 in the drive 2.

In FIG. 4, the layer structure of the device drivers in the OS 30 in relation to the applications 31 through 33 is shown.

The OS 30, which is a Windows® NT OS, implements individual services by a subsystem based on a microkernel technique and an object-oriented technique.

A Win32 subsystem 51, which is one of the subsystems, provides various application program interface (API) functions to the applications 31 through 33, and performs processing, for example, memory management, process management, and graphics drawing.

More specifically, when the API function concerning input/output (I/O) is called from the application 31, 32, or 33, the Win32 subsystem 51 outputs an I/O request corresponding to the API function to an NT I/O manager 52.

The API functions provided by the Win32 subsystem 51 include CreateFile( ) for creating files, ReadFile( ) for reading files (data recorded on files), WriteFile( ) for writing files (data), and DeviceIoControl( ) for performing other processing.

The NT I/O manager 52 provides services for delivering I/O request packets (IRPs) to the device drivers of the layer structure.

The IRPs are packets containing information concerning the processing requested to the device drivers. The IRPs include a code that classifies the content of a request, IRP_MJ_READ indicating a request to read data (file), IRP_MJ_WRITE indicating a request to write (record) data, IRP_MJ_CREATE indicating a request to create a file, and IRP_MJ_DEVICE_CONTROL indicating a request to perform other types of processing. In the IRP_MJ_DEVICE_CONTROL IRP, I/O Control (IOCTL) is specified as the user-defined subcode.

The NT I/O manager 52 converts, for example, an I/O request based on CreateFile( ) from the Win32 subsystem 51, into the IRP_MJ_CREATE IRP. The ReadFile( ) and WriteFile( ) are converted into the IRP_MJ_READ IRP and IRP_MJ_WRITE IRP, respectively, and the DeviceIoControl( ) is converted into the IRP_MJ_DEVICE_CONTROL IRP.

In the Windows® NT OS, the IRPs are handled in the storage class driver layer or higher layers.

In FIG. 4, there are three device drivers corresponding to the storage class driver layer or higher layers, i.e., a PD storage 55, which is the storage class driver, a PD_FS 54 serving as a file system driver, which is one layer higher than the storage class driver, and a PD filter 53 serving as a file system filter driver, which is one layer higher than the file system driver.

Accordingly, in this embodiment, the NT I/O manager 52 provides services for delivering IRPs to the PD filter 53, the PD_FS 54, and the PD storage 55.

More specifically, the NT I/O manager 52 converts an I/O request from the Win32 subsystem 51 into a corresponding IRP, and outputs the IRP to, for example, the PD filter 53. The PD filter 53 then outputs a request in response to the IRP from the NT I/O manager 52 to the NT I/O manager 52. The NT I/O manager 52 then converts the request from the PD filter 53 into a corresponding IRP, and outputs it to the PD_FS 54. The PD_FS 54 then outputs a request in response to the IRP from the NT I/O manager 52 to the NT I/O manager 52. The NT I/O manager 52 then converts the request from the PD_FS 54 into a corresponding IRP and outputs it to the PD storage 55.

The PD filter 53 is a file system filter driver for the drive 2, which is a PD drive, and is higher than the PD_FS 54. The PD filter 53 filters file system requests concerning file systems and other requests supplied from the applications 31 through 33 via the Win32 subsystem 51 and the NT I/O manager 52, and delivers the filtering result and certain requests to the PD_FS 54 via the NT I/O manager 52.

The PD filter 53 includes a filter core 53A, which performs major processing of the PD filter 53, such as filtering of requests from the applications 31 through 33. The PD filter 53 filters requests by referring to information set (stored) in a registry 58, which is the Windows® registry.

The PD_FS 54, which is a file system driver for the drive 2, manages files recorded or to be recorded on the optical disc 3 (PD) installed in the drive 2. That is, the PD_FS 54 outputs a request to read or write a file sent from the PD filter 53 to the PD storage 55 via the NT I/O manager 52 based on a file system indicating information for managing the data (files) recorded on the optical disc 3.

Generally, the file system driver has a cache function of caching file streams (data recorded or to be recorded on files) and file meta-information. By using this cache function, the cached file streams and meta-information can be quickly obtained without physically accessing the optical disc 3.

In the Windows® NT OS, an NT cache manager 59 has a cache function, and the PD_FS 54 provides a cache function by using the NT cache manager 59.

The PD_FS 54 has a FS core 54A, which performs major processing of the PD_FS 54.

The PD storage 55 is a storage class driver, which is the actual device driver for the drive 2, and converts an IRP request supplied from the PD_FS 54, which is a device driver higher than the PD storage 55, via the NT I/O manager 52 into, for example, small computer system interface (SCSI) code and outputs it to a serial bus protocol (SBP) 2 driver 56.

The reason for converting the IRP into the SCSI code in the PD storage 55 is that the SCSI code is most compatible with SBP2 handled in the SBP2 driver 56.

The SBP2 driver 56 converts the SCSI code from the PD storage 55 into SBP2 data, which is data in compliance with the SBP2 standards, and supplies the SBP2 data to a 1394 bus driver 57.

In this embodiment, SBP2 is used as a protocol that can handle file systems in performing communication compliant with the IEEE1394 standards controlled by the 1394 bus driver 57. However, a protocol other than SBP2 may be used.

The IEEE bus driver 57 controls the IEEE1394 interface 22 (FIG. 2) to send the SBP2 data from the SBP2 driver 56 to the drive 2 or to receive data read from the optical disc 3 and sent from the drive 2.

In this embodiment, communication compliant with the IEEE1394 standards is performed between the PC 1 and the drive 2. However, communication other than IEEE1394 communication may be performed, in which case, instead of the 1394 bus driver 57, a bus driver corresponding to the type of communication performed between the PC 1 and the drive 2 is used.

In FIG. 4, the PD_API 41 used by the AV application 33 provides the unique API functions. More specifically, when a unique API function is called from the AV application 33, the PD_API 41 uses the corresponding API function DeviceIoControl( ) provided by the Win32 subsystem 51 to supply the IRP_MJ_DEVICE_CONTROL IRP having the user-defined IOCTL to the PD filter 53 via the NT I/O manager 52. Thus, the PD_API 41 controls the unique function of the PD filter 53, i.e., the function represented by the IOCTL.

The AV application 33 containing the PD_API 41 can be sold by being recorded on the removable recording medium 21 (FIG. 2) together with the PD filter 53, the PD_FS 54, and the PD storage 55 required for using the drive 2. The removable recording medium 21 recording thereon AV application 33, the PD filter 53, the PD_FS 54, and the PD storage 55 can be sold as a single unit. Alternatively, the removable recording medium 21 may be sold as an accessory of the drive 2 by being contained in the drive 2.

In FIG. 4, the applications 31 through 33 and the Win32 subsystem 51 are operated in the user mode, while the NT I/O manager 52, the PD filter 53, the PD_FS 54, the PD storage 55, the SBP2 driver 56, and the 1394 bus driver 57 are operated in the kernel mode.

In FIG. 4, the NT I/O manager 52 delivers IRPs to the PD filter 53, which is the file system filter driver, and the PD_FS 54, which is the file system driver, to request the file system filter driver or the file system driver to perform certain processing. The NT I/O manager 52 of the Windows® NT OS can deliver, not only IRPS, but also FastIO, to the file system filter driver or the file system driver to request the driver to perform processing.

That is, the NT I/O manager 52 also provides services for delivering FastIO to the file system filter driver or the file system driver to request it to perform processing.

Accordingly, the file system filter driver and the file system driver of the Windows® NT OS generally support both the IRP and FastIO.

According to the FastIO, files can be read or written directly from or into the NT cache manager 59.

It is now assumed in this embodiment that, between the IRP and FastIO, the IRP is used. However, the FastIO can also implement functions described below.

Figure 5:
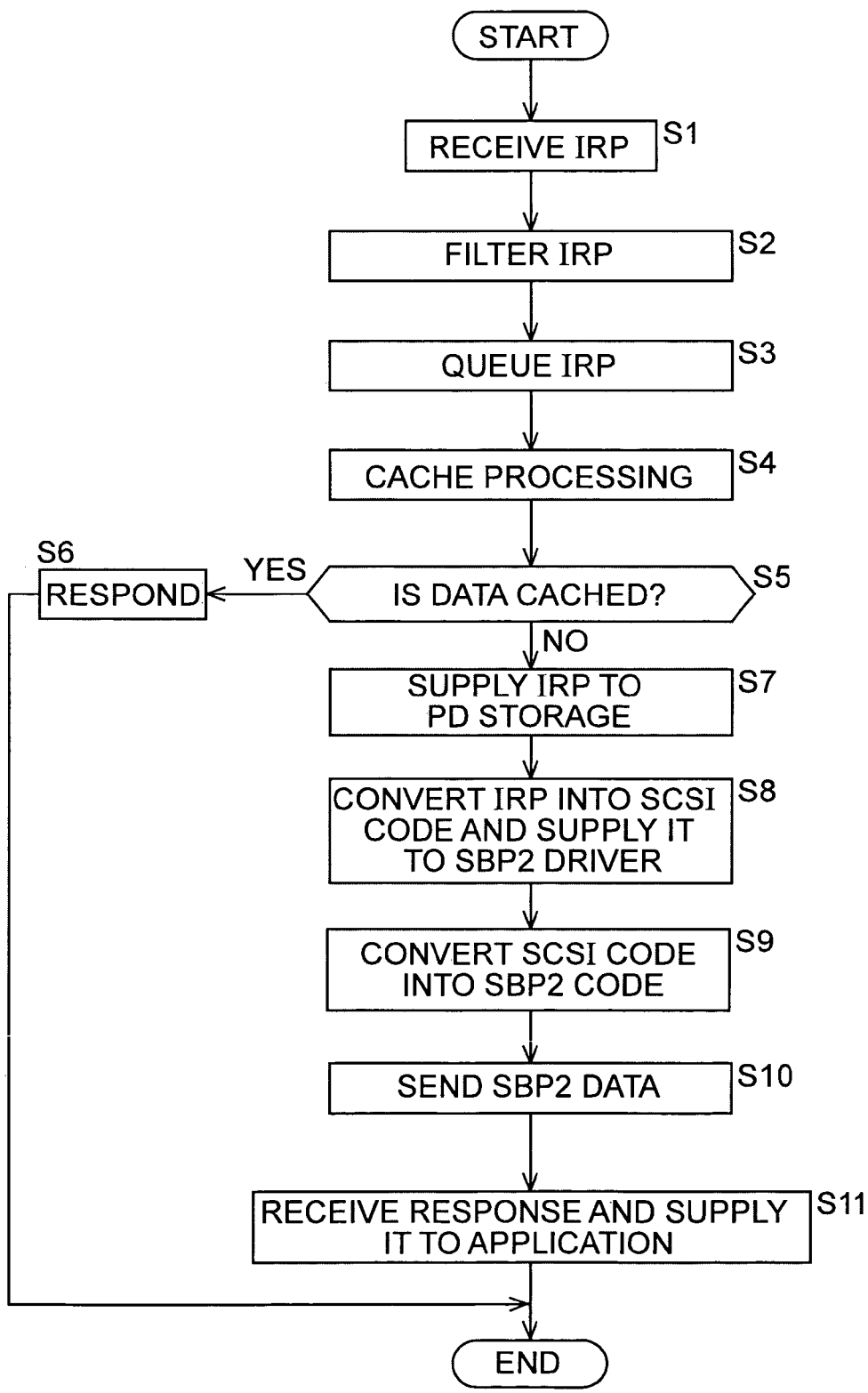
FIG. 5 is a flowchart illustrating the overall processing performed by the OS.

A description is now given, with reference to the flowchart of FIG. 5, of the overall processing performed by the PD filter 53, the PD_FS 54, the PD storage 55, the SBP2 driver 56, and the 1394 bus driver 57 in the OS 30 shown in FIG. 4 in response to a request to access the optical disc 3 from the application 31, 32, or 33.

In the following description and in FIGS. 5 through 25, an explanation and a representation of the Win32 subsystem 51 and the NT I/O manager 52 are omitted unless it is necessary.

When the application 31, 32, or 33 calls the API function indicating a request to access the optical disc 3, the corresponding request is supplied to the NT I/O manager 52 from the Win32 subsystem 51. The NT I/O manager 52 then supplies the IRP corresponding to the request from the Win32 subsystem 51 to the PD filter 53.

In step S1, the PD filter 53 receives the IRP from the NT I/O manager 52. Then, in step S2, the PD filter 53 filters the IRP received from the NT I/O manager 52. In step S3, the PD filter 53 supplies the IRP from the NT I/O manager 52 to a queue (not shown in FIG. 4) and stores it therein. The PD filter 53 then reads the IRP stored in the queue and supplies it to the PD_FS 54 via the NT I/O manager 52.

In step S4, the PD_FS 54 performs cache processing required for using the cache function of the NT cache manager 59 on the data requested by the IRP from the PD filter 53. In step S5, the PD_FS 54 determines whether the data requested by the IRP from the PD filter 53 is cached in the NT cache manager 59.

If it is determined in step S5 that the data requested by the IRP is cached in the NT cache manager 59, the process proceeds to step S6. In step S6, the PD_FS 54 receives the data requested by the IRP from the NT cache manager 59, and returns, via the PD filter 53 and the Win32 subsystem 51, a response to the IRP to the application 31, 32, or 33 that has called the API function corresponding to the IRP.

If it is determined in step S5 that the data requested by the IRP is not cached in the NT cache manager 59, the process proceeds to step S7. In step S7, the PD_FS 54 supplies the IRP from the PD filter 53 to the PD storage 55 via the NT I/O manager 52.

In step S8, the PD storage 55 converts the IRP from the PD_FS 54 into the corresponding SCSI code and supplies it to the SBP2 driver 56.

In step S9, the SBP2 driver 56 converts the SCSI code into the SBP2 data and supplies it to the 1394 bus driver 57.

In step S10, the 1394 bus driver 57 controls the IEEE1394 interface 22 (FIG. 2) to send the SBP2 data from the SBP2 driver 56 to the drive 2.

Then, the 1394 bus driver 57 waits for a response to the SBP2 data sent in step S10 from the drive 2. In step S11, the 1394 bus driver 57 receives a response and returns it to the application 31, 32, or 33 that has sent the IRP received in step S1 via the SBP2 driver 56, the PD storage 55, the PD_FS 54: the PD filter 53, and the Win32 subsystem 51.

In FIG. 4, if, among the applications 31 through 33, one application accesses the optical disc 3 before another application (for example, the application 33) does, a seek is required when the application 33 accesses the optical disc 3. The application 33 also has to wait for access to the optical disc 3.

In FIG. 4, the application 33 is an AV application that writes (records) or reads (plays back) AV data into or from the optical disc 3.

If the drive 2 is designed to read or write AV data in real time in response to access only from the AV application 33, a seek is required by access of the application 31 or 32 to the optical disc 3. Also, the AV application 33 has to wait for access to the optical disc 3. As a result, it is difficult for the AV application 33 to read or write AV data in real time.

Accordingly, the PD filter 53 has at least one of the following three functions, and can reliably read or write AV data from and into the optical disc 3 in real time.

In the first function, the PD filter 53 sets a specific priority for an IRP corresponding to a request to access the optical disc 3 from the application 31, 32, or 33, and stores the IRP with the specific priority in a queue. Then, the PD filter 53 processes the IRP stored in the queue according to the priority set for the IRP. With this arrangement, the PD filter 53 can preferentially process an IRP indicating an access request from the AV application 33, thereby ensuring the real-time reading and writing of AV data by the AV application 33.

Figure 6:
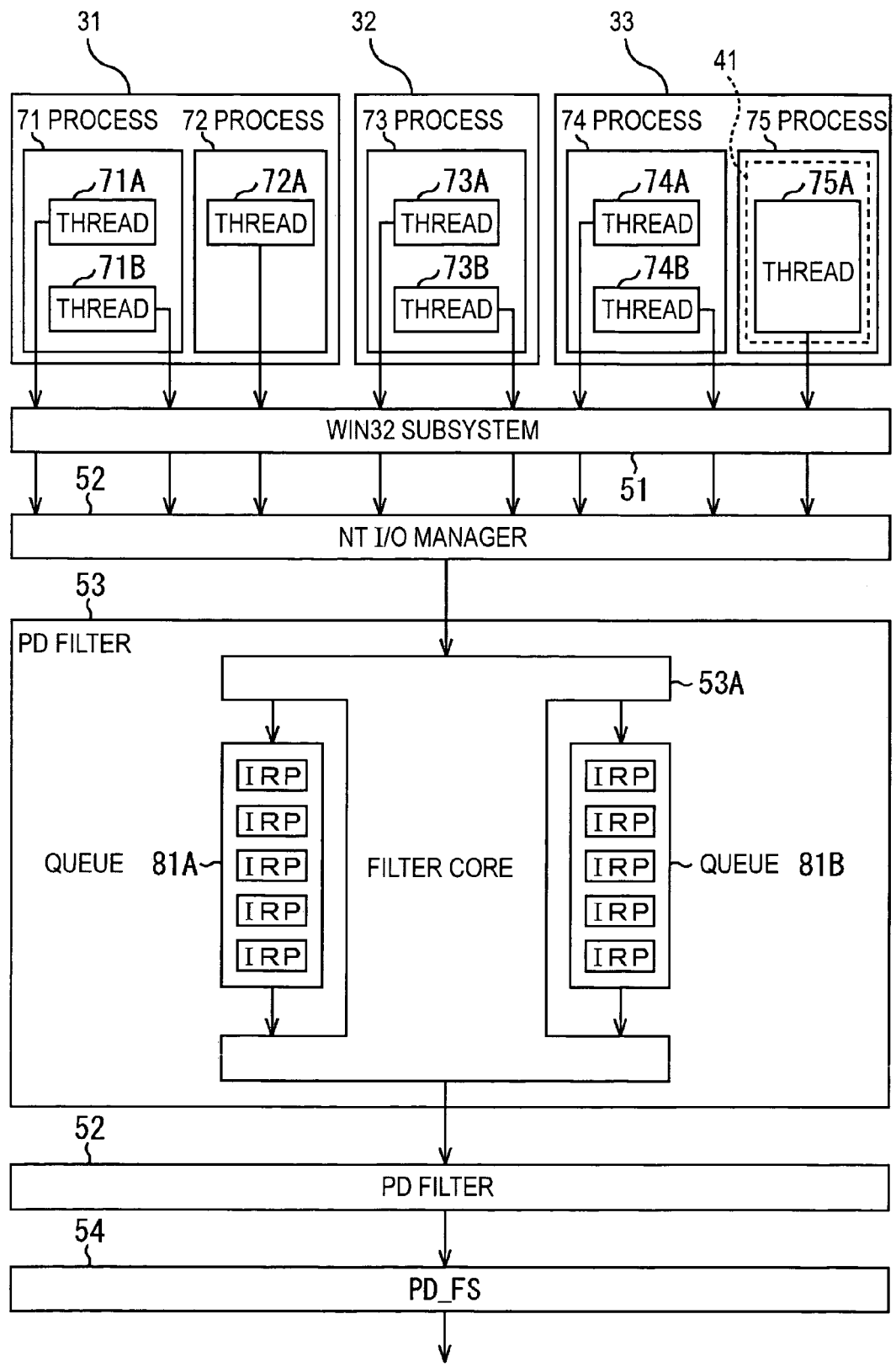
FIG. 6 is a block diagram illustrating an example of the configuration of a PD filter implementing a first function or a second function.

FIG. 6 illustrates an example of the configuration of the PD filter 53 implementing the above-described first function. In FIG. 6, the applications 31 through 33 are also shown.

The OS 30, which is the Windows® NT OS, executes an application in units of so-called "processes". To execute a process, at least one thread is assigned to the process, and the process is executed in the thread(s).

In FIG. 6, the application 31 contains two processes 71 and 72. The process 71 is executed by two threads 71A and 71B, while the process 72 is executed by one thread 72A.

The application 32 contains one process 73, and the process 73 is executed by two threads 73A and 73B.

The AV application 33 contains two processes 74 and 75. The process 74 is executed by two threads 74A and 74B, while the process 75 is executed by one thread 75A. The process 75 is the process of the PD_API 41.

The calling of the API functions to the Win32 subsystem 51 can be performed in units of threads. Accordingly, in the configuration shown in FIG. 6, an API function can be called in each of the threads 71A, 71B, 72A, 73A, 73B, 74A, 74B, and 75A.

To call an API function from a thread is to call the API function from the process executed by the thread.

When an API function is called in one of the threads 71A through 75A, the corresponding IRP is supplied to the PD filter 53 from the NT I/O manager 52.

In the PD filter 53, the filter core 53A sets a specific priority (hereinafter sometimes referred to as an "IRP priority") concerning access to the optical disc 3 for the IRP from the NT I/O manager 52.

The OS 30, which is the Windows® NT OS, has a standard priority function of setting a priority for the processes and threads and executing the processes and threads according to the priority. According to this priority function, the resource of the PC 1, such as the CPU 12, the RAM 14, etc., is preferentially assigned to the processes and threads having a higher priority set by the OS 30.

Accordingly, by using the priority function, a higher priority can be set in the processes 74 and 75 of the AV application 33 than in the processes 71 and 72 of the application 31 and in the process 73 of the application 32, thereby allowing the AV application 33 to preferentially access the optical disc 3 over the applications 31 and 32.

However, the priority function of the OS 30 influences, not only access to the optical disc 3, but also the use of the CPU 12 and access to the RAM 14.

Accordingly, if a higher priority is set in the processes of the AV application 33 by using the priority function, processes for important services provided by the OS 30 may have to wait for a long time to use the CPU 12 or the RAM 14. This may cause the interruption of the execution of the important services, in the worst case, causing hang-up of the PC 1.

Thus, in the PD filter 53, the filter core 53A sets the IRP priority, which is independent of the priority set by the standard priority function, for IRPs supplied from the NT I/O manager 52.

The IRP priority is the priority only for access to the optical disc 3. Thus, when a higher IRP priority is set for the AV application 33, the IRP priority influences processes only concerning access to the optical disc 3, and other processes of services provided by the OS 30, such as the use of the CPU 12 or the RAM 14, are not restricted. According to the IRP priority, therefore, the interruption of important services provided by the OS 30 or hang-up of the PC 1 can be prevented.

The PD filter 53 sets the IRP priority for an IRP from the NT I/O manager 52, and then supplies the IRP to a queue 81A or 81B and stores it therein. That is, the queues 81A and 81B store therein IRPs with the IRP priority supplied from the filter core 53A.

In the configuration shown in FIG. 6, the two queues 81A and 81B are provided, assuming that there are two volumes in the drive 2. That is, the queues 81A and 81B are associated with the two corresponding volumes. The PD filter 53 supplies IRPs corresponding to the volume associated with the queue 81A to the queue 81A, and supplies IRPs corresponding to the volume associated with the queue 81B to the queue 81B. The queues 81A and 81B are hereinafter simply referred to as the "queue 81" unless it is necessary to distinguish them.

The PD filter 53 processes the IRPs stored in the queue 81 according to the IRP priority set for the IRPs. That is, the PD filter 53 preferentially reads the IRP having a higher IRP priority from the queue 81, and supplies it to the PD_FS 54 via the NT I/O manager 52.

The threads for performing processing of the first function (the same applies to the second and third functions) are formed in the file system filter driver layer, which is the layer of the PD filter 53. The queue 81 storing the IRPs is also formed by the file system filter driver layer.

To preferentially process the IRPs from the AV application 33 over the IRPs from the applications 31 and 32 by using the PD filter 53, the PD filter 53 sets the highest IRP priority for the IRPs having process IDs that are registered in the PD filter 53 and also sets the lowest IRP priority for the IRPs having process IDs that are not registered in the PD filter 53.

That is, the OS 30 manages individual processes by assigning unique process IDs to the processes, and an IRP from each process (IRP associated with an API function called by each process) has the unique process ID. Then, if the process ID provided for an IRP from a certain process received from the NT I/O manager 52 coincides with the process ID registered in the PD filter 53, the PD filter 53 sets the highest IRP priority for the received IRP. If the process ID for the received IRP is different from the process ID registered in the PD filter 53 (or if no process ID is registered in the PD filter 53), the PD filter 53 sets the lowest IRP priority for the IRP.

The data representing the IRP priority has, for example, 5 bits. In this case, the highest IRP priority is 31, while the lowest IRP priority is 0.

To use the first function of the PD filter 53, when being loaded, the PD_API 41 used (loaded) in the AV application 33 requests the PD filter 53 to register the process ID of the process 75, which loads the PD_API 41, by using the API function DeviceIoControl( ) provided by the Win32 subsystem 51. That is, when the AV application 33 is started to load the PD_API 41 by the process 75 of the AV application 33, the PD_API 41 calls the API function DeviceIoControl( ) that requests the PD filter 53 to register the process ID assigned to the process 75.

When finishing the process 75, the PD_API 41 also calls the API function DeviceIoControl( ) that requests the PD filter 53 to delete the process ID assigned to the process 75.

Accordingly, as long as the process 75 of the PD_API 41 is present, the highest IRP priority is set in the PD filter 53 for the IRP from the process 75 (IRP associated with the API function provided by the Win32 subsystem 51 and called by the process 75 (PD_API 41)).

FIG. 7 illustrates the API functions for allowing the PD_API 41 to control the PD filter 53 when the PD filter 53 performs processing by using the first function. The API functions shown in FIG. 7 are supplied to the AV application 33.

In FIG. 7, the API functions for allowing the PD_API 41 to control the PD filter 53 include two functions, i.e., PdGetPriority( ) and PdSetPriority( ). In both the API functions PdGetPriority( ) and PdSetPriority( ), the process ID and the IRP priority are used as arguments.

When the API function PdGetPriority( ) is called by specifying the process ID as the argument, the IRP priority set by the PD filter 53 in response to the process having the specified process ID is returned together with the argument. In the API function PdGetPriority( ), when the acquisition of the IRP priority set by the PD filter 53 for the process having the specified process ID has succeeded, 1 is returned as the return value, and when the acquisition of the IRP priority has failed, 0 is returned as the return value.

According to the API function PdGetPriority( ), the IRP priority set by the PD filter 53 for the IRP from a certain process can be identified.

When the API function PdSetPriority( ) is called by specifying the process ID and the IRP priority as the arguments, the IRP priority set by the PD filter 53 for the process having the specified process ID as the argument is changed to the IRP priority used as the argument. In the API function PdSetPriority( ), when the IRP priority set by the PD filter 53 has been successfully changed, 1 is returned as the return value, and when the IRP priority has not been successfully changed, 0 is returned.

According to the API function PdSetPriority( ), the IRP priority set by the PD filter 53 for an IRP from a process having the process ID which is registered in the PD filter 53 or an IRP from a process having the process ID which is not registered in the PD filter 53 can be set.

When the API function PdGetPriority( ) is called, the PD_API 41 calls the API function DeviceIoControl( ) that requests the PD filter 53 to send the IRP priority set by the PD filter 53.

When the API function PdSetPriority( ) is called, the PD_API 41 calls the API function DeviceIoControl( ) that requests the PD filter 53 to change the IRP priority set by the PD filter 53.

As discussed above, in order to use the first function of the PD filter 53, the PD_API 41 calls the API function DeviceIoControl( ) indicating a request to register the process ID and the API function DeviceIoControl( ) indicating a request to delete the process ID, and if necessary, the API function DeviceIoControl( ) indicating a request to send the IRP priority set by the PD filter 53 and the API function DeviceIoControl( ) indicating a request to change the IRP priority set by the PD filter 53.

When the API function DeviceIoControl( ) is called, the Win32 subsystem 51 sends a request in response to the API function DeviceIoControl( ) to the NT I/O manager 52. The NT I/O manager 52 then converts the request into the IRP_MJ_DEVICE_CONTROL IRP, and supplies it to the PD filter 53.

As stated above, in the IRP_MJ_DEVICE_CONTROL IRP, the user-defined IOCTL is specified as the subcode.

FIG. 8 illustrates the user-defined IOCTL specified in the IRP_MJ_DEVICE_CONTROL when the PD filter 53 performs processing by using the first function.

In FIG. 8, four IOCTL (subcodes), i.e., IOCTL_PD_SET_PROCESSID, IOCTL_PD_DELETE_PROCESSID, IOCTL_PD_SET_PRIORITY, and IOCTL_PD_GET_PRIORITY, are prepared as the user-defined IOCTL.

The IOCTL_PD_SET_PROCESSID is IOCTL serving as the subcode of the IRP_MJ_DEVICE_CONTROL IRP in response to the API function DeviceIoControl( ) indicating a request to register the process ID. The API function DeviceIoControl( ) indicating a request to register the process ID uses the process ID to be registered as the argument, and the IOCTL_PD_SET_PROCESSID is IOCTL that requests the PD filter 53 to register the process ID into the PD filter 53.

The IOCTL_PD_DELETE_PROCESSID is IOCTL serving as the subcode of the IRP_MJ_DEVICE_CONTROL IRP in response to the API function DeviceIoControl( ) indicating a request to delete the process ID. The API function DeviceIoControl( ) indicating a request to delete the process ID uses the process ID to be deleted as the argument, and the IOCTL_PD_DELETE_PROCESSID is IOCTL that requests the PD filter 53 to delete the process ID from the PD filter 53.

The IOCTL_PD_SET_PRIORITY is IOCTL serving as the subcode of the IRP_MJ_DEVICE_CONTROL IRP in response to the API function DeviceIoControl( ) indicating a request to change the IRP priority set by the PD filter 53. According to this IOCTL, the IRP priority set for the IRP having the process ID, which is used as the argument of the API function PdSetPriority( ) shown in FIG. 7 in response to the API function DeviceIoControl( ) indicating a request to change the IRP priority set by the PD filter 53, is changed into the IRP priority, which is also used as the argument of the API function PdSetPriority( ).

The IOCTL_PD_GET_PRIORITY is IOCTL serving as the subcode of the IRP_MJ_DEVICE_CONTROL IRP in response to the API function DeviceIoControl( ) indicating a request to obtain the IRP priority set by the PD filter 53. According to this IOCTL, the IRP priority set for the IRP having the process ID, which is used as the argument of the API function PdGetPriority( ) shown in FIG. 7 in response to the API function DeviceIoControl( ) indicating a request to obtain the IRP priority set by the PD filter 53, is requested.

The user-defined IOCTL, which is to be the subcode of the IRP_MJ_DEVICE_CONTROL IRP, is delivered from the Win32 subsystem 51 to the NT I/O manager 52 by using the API function DeviceIoControl( ) provided by the Win32 subsystem 51, and is specified as the subcode of the IRP_MJ_DEVICE_CONTROL IRP by the NT I/O manager 52.

A description is now given, with reference to the flowchart of FIG. 9, of the overall processing by the AV application 33, the PD_API 41, and the PD filter 53 shown in FIG. 6 when the PD filter 53 implements the first function.

When the AV application 33 is started, in step S21, the AV application 33 loads the PD_API 41 by the process 75. Then, in step S31, the PD_API 41 calls the API function DeviceIoControl( ) indicating a request to register the process ID of the process 75, which has loaded the PD_API 41, so that the IRP_MJ_DEVICE_CONTROL IRP having the IOCTL_PD_SET_PROCESSID specified as IOCTL indicating a request to register the process ID of the process 75 is supplied to the PD filter 53 from the NT I/O manager 52.

In step S41, the PD filter 53 receives the IRP from the NT I/O manager 52 and registers the process ID of the process 75 of the PD_API 41 according to the IOCTL_PD_SET_PROCESSID of the IRP.

Accordingly, thereafter, unless the process ID of the process 75 of the PD_API 41 is deleted, the highest IRP priority is set for the IRPs from the process 75, and the lowest IRP priority is set for the IRPs from the other processes. Thus, in the PD filter 53, the IRPs from the process 75 can be preferentially processed.

More specifically if in step S22, for example, the AV application 33 calls the API function ReadFile( ) indicating a request to read a file as a request to access the optical disc 3, the PD_API 41 receives the calling of the API function ReadFile( ) in step S32.

In step S33, in response to the calling of the API function ReadFile( ) from the AV application 33, the PD_API 41 calls the same API function ReadFile( ) provided by the Win32 subsystem 51, and then, the IRP_MJ_READ IRP indicating a request to read a file is supplied to the PD filter 53 from the NT I/O manager 52.

In step S42, the PD filter 53 receives the IRP_MJ_READ IRP from the NT I/O manager 52 and sets the IRP priority for the IRP_MJ_READ IRP.

More specifically, the IRP_MJ_READ IRP received by the PD filter 53 in step S42 is the IRP from the process 75 of the PD_API 41. The process ID of the process 75 is registered in the PD filter 53 in step S41. Accordingly, the IRP_MJ_READ IRP received from the process 75 by the PD filter 53 in step S42 has the highest IRP priority.

As a result, in the PD filter 53, the IRP_MJ_READ IRP from the process 75 of the PD_API 41 is immediately processed unless there is no other IRP having the highest IRP priority.

In step S43, the PD filter 53 preferentially supplies the IRP_MJ_READ IRP from the process 75 of the PD_API 41 to the PD_FS 54.

Then, when the AV application 33 is finished, in step S23, the AV application 33 requests the process 75 of the PD_API 41 to unload the PD_API 41.

In response to this request, in step S34, the PD_API 41 calls the API function DeviceIoControl( ) indicating a request to delete the process ID of the process 75 so that the IRP_DEVICE_CONTROL IRP having the IOCTL_PD_DELETE_PROCESSID specified as the IOCTL indicating a request to delete the process ID of the process 75 is supplied to the PD filter 53 from the NT I/O manager 52.

In step S44, the PD filter 53 receives the IRP from the NT I/O manager 52 and deletes the process ID of the process 75 of the PD_API 41 according to the IOCTL_PD_DELETE_PROCESSID of the IRP.

Thus, thereafter, in the PD filter 53, the IRPs are processed according to the priority set by the standard priority function of the OS 30.

The processing by the PD filter 53 shown in FIG. 6 to implement the first function is discussed below with reference to the flowcharts of FIGS. 10 and 11.

Figure 10:
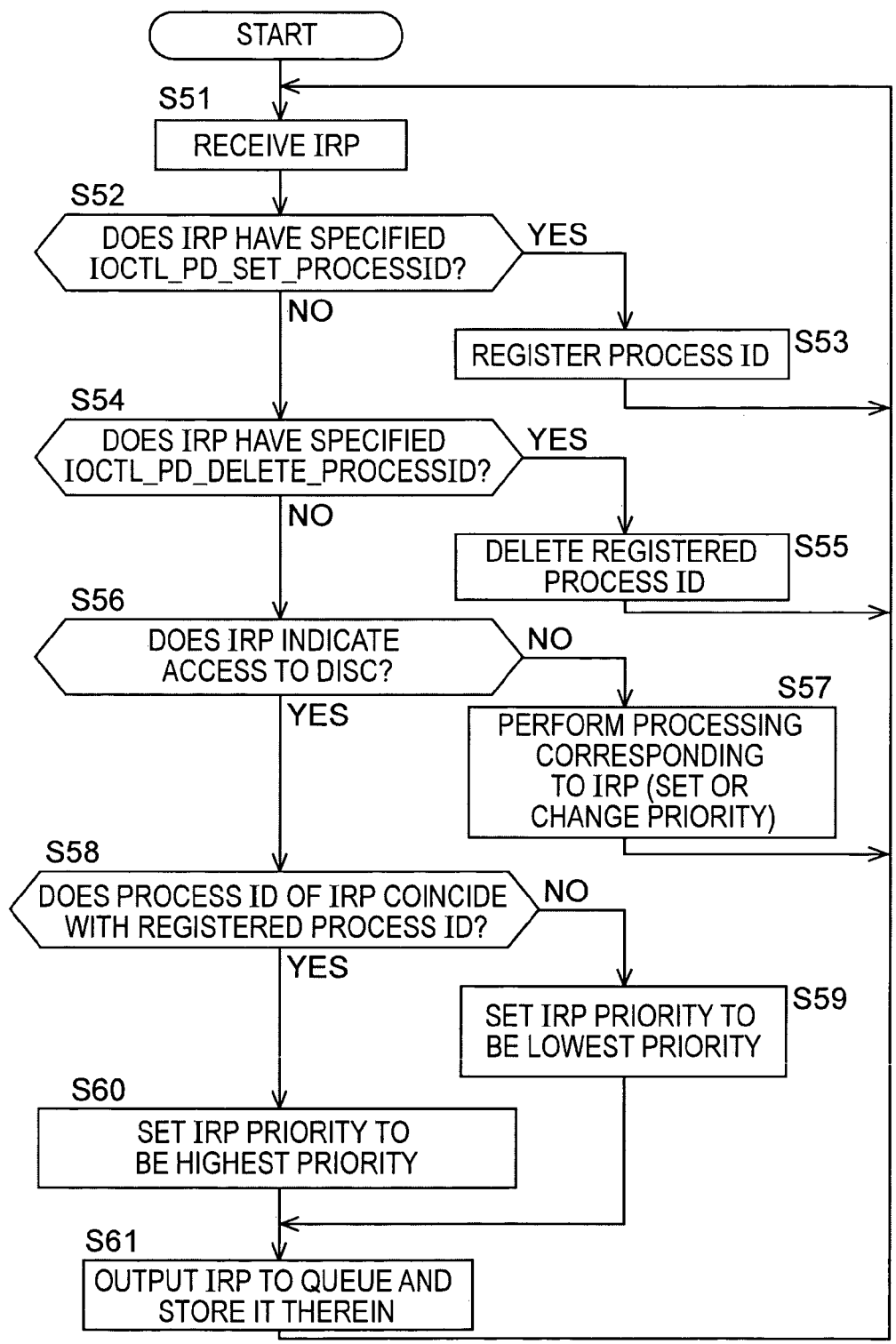
FIGS. 10 and 11 are flowcharts illustrating processing performed by using the first function.

Reference is first given to the flowchart of FIG. 10 to discuss the processing from when an IRP is received by the PD filter 53 shown in FIG. 6 having the first function to when the IRP is stored in the queue 81 (processing for inputting an IRP into the queue 81).

In response to the calling of the API function indicating a request to perform I/O-related processing on the drive 2 by one of the processes 71 through 75 of the applications 31 through 33, the Win32 subsystem 51 outputs a request to the NT I/O manager 52, and the NT I/O manager 52 supplies the IRP corresponding to the API function to the PD filter 53 in response to the request output from the Win32 subsystem 51.

In the PD filter 53, in step S51, the filter core 53A receives the IRP requested by the process that has called the API function from the NT I/O manager 52. In step S52, the filter core 53A determines whether the IRP is the IRP_MJ_DEVICE_CONTROL IRP having the IOCTL_PD_SET_PROCESSID (FIG. 8) specified as the IOCTL.

If it is determined in step S52 that the IRP received by the filter core 53A in step S51 is the IRP_MJ_DEVICE_CONTROL IRP having the IOCTL_PD_SET_PROCESSID specified as the IOCTL, the process proceeds to step S53. In step S53, the filter core 53A registers (stores) the process ID contained in the IRP, that is, the process ID of the process that has called the API function corresponding to the IRP, and the process then returns to step S51.

That is, the IRP having the IOCTL_PD_SET_PROCESSID specified as the IOCTL contains the process ID of the process that has called the API function corresponding to the IRP, and the filter core 53A registers the process ID. The process ID registered by the filter core 53A is hereinafter referred to as the "registered process ID".

If it is determined in step S52 that the IRP requested by the process is not the IRP having the IOCTL_PD_SET_PROCESSID specified as the IOCTL, the process proceeds to step S54 to determine whether the IRP is the IRP_MJ_DEVICE_CONTROL IRP having the IOCTL_PD_DELETE_PROCESSID (FIG. 8) specified as the IOCTL.

If it is determined in step S54 that the IRP is the IRP having the IOCTL_PD_DELETE_PROCESSID specified as the IOCTL, the process proceeds to step S55. In step S55, the filter core 53A deletes the registered process ID, and the process then returns to step S51.

If it is determined in step S54 that the IRP is not the IRP having the IOCTL_PD_DELETE_PROCESSID specified as the IOCTL, the process proceeds to step S56 to determine whether the IRP is the IRP indicating a request to access the optical disc 3.

If it is determined in step S56 that the IRP requested by the process is not the IRP indicating an access request, i.e., that the IRP is the IRP_MJ_DEVICE_CONTROL IRP having the IOCTL_PD_SET_PRIORITY (FIG. 8) specified as the IOCTL indicating a request to change the IRP priority set by the PD filter 53 or the IRP_MJ_DEVICE_CONTROL IRP having the IOCTL_PD_GET_PRIORITY (FIG. 8) specified as the IOCTL indicating a request to obtain the IRP priority set by the PD filter 53, the process proceeds to step S57. In step S57, the filter core 53A performs processing based on the IRP, and returns as a response the processing result to the process that has called the API function via the NT I/O manager 52 and the Win32 subsystem 51. The process then returns to step S51.

If the IRP requested by the process is the IRP having the IOCTL_PD_SET_PRIORITY specified as the IOCTL, in step S57, the filter core 53A changes the IRP priority set for the IRP requested by the process having the process ID specified in the IOCTL_PD_SET_PRIORITY into the IRP priority also specified in the IOCTL_PD_SET_PRIORITY. If the IRP requested by the process is the IRP having the IOCTL_PD_GET_PRIORITY specified as the IOCTL, in step S57, the filter core 53A returns the IRP priority set for the IRP requested by the process having the process ID specified in the IOCTL_PD_GET_PRIORITY as a response.

If it is determined in step S56 that the IRP requested by the process is the IRP indicating an access request, i.e., that the IRP is the IRP_MJ_READ IRP indicating a request to read a file or the IRP_MJ_WRITE IRP indicating a request to write a file, the process proceeds to step S58. In step S58, the filter core 53A determines whether the process ID contained in the IRP requested by the process, i.e., the process ID of the process that has called the API function corresponding to the IRP, coincides with the registered process ID.

If it is determined in step S58 that the process ID contained in the IRP requested by the process does not coincide with the registered process ID, the process proceeds to step S59. In step S59, the filter core 53A sets the lowest IRP priority for the IRP requested by the process, and the process proceeds to step S61.

If it is determined in step S58 that the process ID contained in the IRP requested by the process coincides with the registered process ID, the process proceeds to step S60. In step S60, the filter core 53A sets the highest IRP priority for the IRP requested by the process, and the process proceeds to step S61.

In step S61, the filter core 53A outputs the IRP with the IRP priority set in step S59 or step S60 to the queue 81 and stores it therein, and waits for another IRP. The process then returns to step S51.

In FIG. 10, if the process ID contained in the IRP requested by the process is different from the registered process ID, the lowest IRP priority is set for the IRP. If the process ID contained in the IRP is the same as the registered process ID, the highest IRP priority is set for the IRP. However, another level of the IRP priority may be set for the IRPs.

The IRP priority set for the IRP having a certain process ID, for example, the IRP having the process ID that coincides with the registered process ID, can be specified by the API function PdSetPriority( ) shown in FIG. 7.

As the registered process ID, a plurality of process IDs may be registered. In this case, a unique IRP priority can be assigned to each of the registered IDs, and the IRP priority assigned to a certain registered process ID is set for the IRP having the process ID that coincides with the registered process ID.

The processing (processing for outputting an IRP from the queue 81) performed on the IRP stored in the queue 81 by the PD filter 53 shown in FIG. 6 having the first function is described below with reference to the flowchart of FIG. 11.

In the PD filter 53, in step S71, the filter core 53A searches for the highest IRP priority from the IRPs stored in the queue 81.

In step S72, the filter core 53A processes the IRP having the highest IRP priority searched in step S71, and the process returns to step S71. More specifically, in step S72, the filter core 53A preferentially reads the IRP having the highest IRP priority from the queue 81 and outputs it to the PD_FS 54 via the NT I/O manager 52.

If a plurality of IRPs having the highest IRP priority are searched in step S71, the filter core 53A processes the plurality of IRPs according to the standard priority function of the OS 30 or the time at which the IRPs are stored in the queue 81. That is, the filter core 53A preferentially reads from the queue 81 the IRP from the process having the highest priority based on the standard priority function or the IRP stored at the earliest time, and outputs the selected IRP to the PD_FS 54.

As discussed above, in the PD filter 53, the IRP priority, which is different from the standard priority function of the OS 30, is set for the IRPs. More specifically, the highest IRP priority is set for the IRP requested by the process having the process ID that coincides with the registered process ID, while the lowest IRP priority is set for the IRP requested by the process having the process ID that does not coincide with the registered process ID.

The PD filter 53 then stores the IRP provided with the IRP priority in the queue 81, and processes the IRP stored in the queue 81 according to the IRP priority.

In the AV application 33, when the PD_API 41 is loaded by the process 75, the PD_API 41 requests the PD filter 53 to register the process ID of the process 75, and the PD filter 53 registers the process ID of the process 75 of the PD_API 41.

Then, the AV application 33 makes a request to access the optical disc 3 through the process 75 of the PD_API 41.

Accordingly, in the PD filter 53, the IRP indicating a request to access the optical disc 3 by the AV application 33 is preferentially processed over the IRPs from the applications 31 and 32. Thus, it is not necessary that the AV application 33 wait until the processing on the IRPs from the application 31 or 32 is finished or that a seek is required in the drive 2 caused by the processing on the IRPs from the application 31 or 32. As a result, the interruption of the reading and writing of data from and into the optical disc 3 by the AV application 33 can be prevented, and thus, AV data can be recorded or played back on or from the optical disc 3 in real time.

To record or play back AV data on or from the optical disc 3 in real time, it is only necessary that the IRPs indicating a request to access the optical disc 3 by the AV application 33 be preferentially processed while the AV data is being recorded or played back by the AV application 33.

In the above-described embodiment, as discussed with reference to FIG. 9, the IRPs indicating a request to access the optical disc 3 by the AV application 33 are preferentially processed only while the PD_API 41 is loaded by the PD filter 53.

Accordingly, instead of loading the PD_API 41 when the AV application 33 is started and unloading the PD_API 41 when the AV application 33 is finished, the PD_API 41 may be loaded when the recording or playback operation of the AV data is started by the AV application 33 and unloaded when the recording or playback operation is finished.

The second function of the PD filter 53 for reliably reading and writing AV data in real time is described below.

More specifically, according to the second function, the PD filter 53 sets a pause flag indicating whether the processing on IRPs indicating a request to access the optical disc 3 from the applications 31 through 33 is allowed or prohibited, and also stores the IRPs from the applications 31 through 33 in the queue 81. The PD filter 53 then processes the IRPs stored in the queue 81 according to the pause flag. With this arrangement, the PD filter 53 interrupts the processing on IRPs from applications other than the AV application 33, and processes only the IRPs from the AV application 33. As a result, AV data can be reliably read or written by the AV application 33 in real time.

That is, by using the second function, the PD filter 53 enters one of the following two states: the pause state in which only specific IRPs are processed without processing the other IRPs according to the pause flag and the run state in which all IRPs are processed.

The PD filter 53 having the above-described second function is configured, for example, as that shown in FIG. 6.

More specifically, in the PD filter 53 having the second function, in addition to the registration of the process ID and the setting of the IRP priority for IRPs, the filter core 53A sets the pause flag. The filter core 53A also processes the IRPs stored in the queue 81 according to, not only the IRP priority, but also the pause flag.

In order to use the second function of the PD filter 53, the PD_API 41 used by the AV application 33 provides API functions for setting the PD filter 53 in the pause state or in the run state to the AV application 33.

FIG. 12 illustrates the API functions for allowing the PD_API 41 to control the PD filter 53 when the PD filter 53 performs processing by using the second function. The API functions shown in FIG. 12 are supplied to the AV application 33.

In FIG. 12, the above-described API functions for controlling the PD filter 53 are omitted.

In FIG. 12, the API functions for allowing the PD_API 41 to control the PD filter 53 include two functions, i.e., PdPauseOtherAppIrp( ) and PdRunOtherAppIrp( ).

According to the API function PdPauseOtherAppIrp( ), the PD filter 53 is in the pause state to process only specific IRPs by interrupting the processing on the other IRPs. According to the API function PdRunOtherAppIrp( ), the PD filter 53 is in the run state to process all IRPs.

Both the API functions PdPauseOtherAppIrp( ) and PdRunOtherAppIrp( ) use the volume name for specifying a volume as the argument.

By calling the API function PdPauseOtherAppIrp( ) by specifying the volume name as the argument, the PD filter 53 is in the pause state to process only specific IRPs among IRPs indicating a request to access the volume specified by the volume name as the argument and to interrupt the processing on the other IRPs.

By calling the API function PdRunOtherAppIrp( ) by specifying the volume name as the argument, the PD filter 53 is in the run state to process all IRPs indicating a request to access the volume specified by the volume name as the argument.

The PD filter 53 can be set in the pause state or in the run state for each volume, i.e., each queue associated with the corresponding volume. For example, in the PD filter 53, the pause state or the run state can be set in each of the queues 81A and 81B.

For the sake of simplicity, however, the same state, i.e., the pause state or the run state, is set for both the queues 81A and 81B.

In the API function PdPauseOtherAppIrp( ), if the PD filter 53 has been successfully set in the pause state, 1 is returned as the return value, and if the PD filter 53 has not been successfully set in the pause state, 0 is returned as the return value. Similarly, in the API function PdRunOtherAppIrp( ), if the PD filter 53 has been successfully set in the run state, 1 is returned as the return value, and if the PD filter 53 has not been successfully set in the run state, 0 is returned as the return value.

When the API function PdPauseOtherAppIrp( ) is called, the PD_API 41 calls the API function DeviceIoControl( ) which requests the PD filter 53 to be in the pause state.

When the API function PdRunOtherAppIrp( ) is called, the PD_API 41 calls the API function DeviceIoControl( ) which requests the PD filter 53 to be in the run state.

When the API function DeviceIoControl( ) is called, the Win32 subsystem 51 outputs a request in response to the API function DeviceIoControl( ) to the NT I/O manager 52, and the NT I/O manager 52 converts the request into the IRP_MJ_DEVICE_CONTROL IRP and supplies it to the PD filter 53.

As stated above, in the IRP_MJ_DEVICE_CONTROL, IOCTL is specified as user-defined subcode.

FIG. 13 illustrates the user-defined IOCTL specified in the IRP_MJ_DEVICE_CONTROL when the PD filter 53 performs processing by using the second function.

As in FIG. 12, in FIG. 13, the user defined IOCTL discussed above are not shown.

In FIG. 13, two IOCTL subcodes, i.e., IOCTL_PD_PAUSE_OTHERAPPIRP and IOCTL_PD_RUN_OTHERAPPIRP, are prepared as the user-defined IOCTL.

The IOCTL_PD_PAUSE_OTHERAPPIRP is IOCTL serving as the subcode of the IRP_MJ_DEVICE_CONTROL IRP in response to the API function DeviceIoControl( ) indicating a request to set the PD filter 53 in the pause state.

The IOCTL_PD_RUN_OTHERAPPIRP is IOCTL serving as the subcode of the IRP_MJ_DEVICE_CONTROL IRP in response to the API function DeviceIoControl( ) indicating a request to set the PD filter 53 in the run state.

The user-defined IOCTL, which is to be the subcode of the IRP_MJ_DEVICE_CONTROL IRP, is delivered from the Win32 subsystem 51 to the NT I/O manager 52 by using the API function DeviceIoControl( ) provided by the Win32 subsystem 51, and is specified as the subcode of the IRP_MJ_DEVICE_CONTROL IRP by the NT I/O manager 52.

Figure 14:
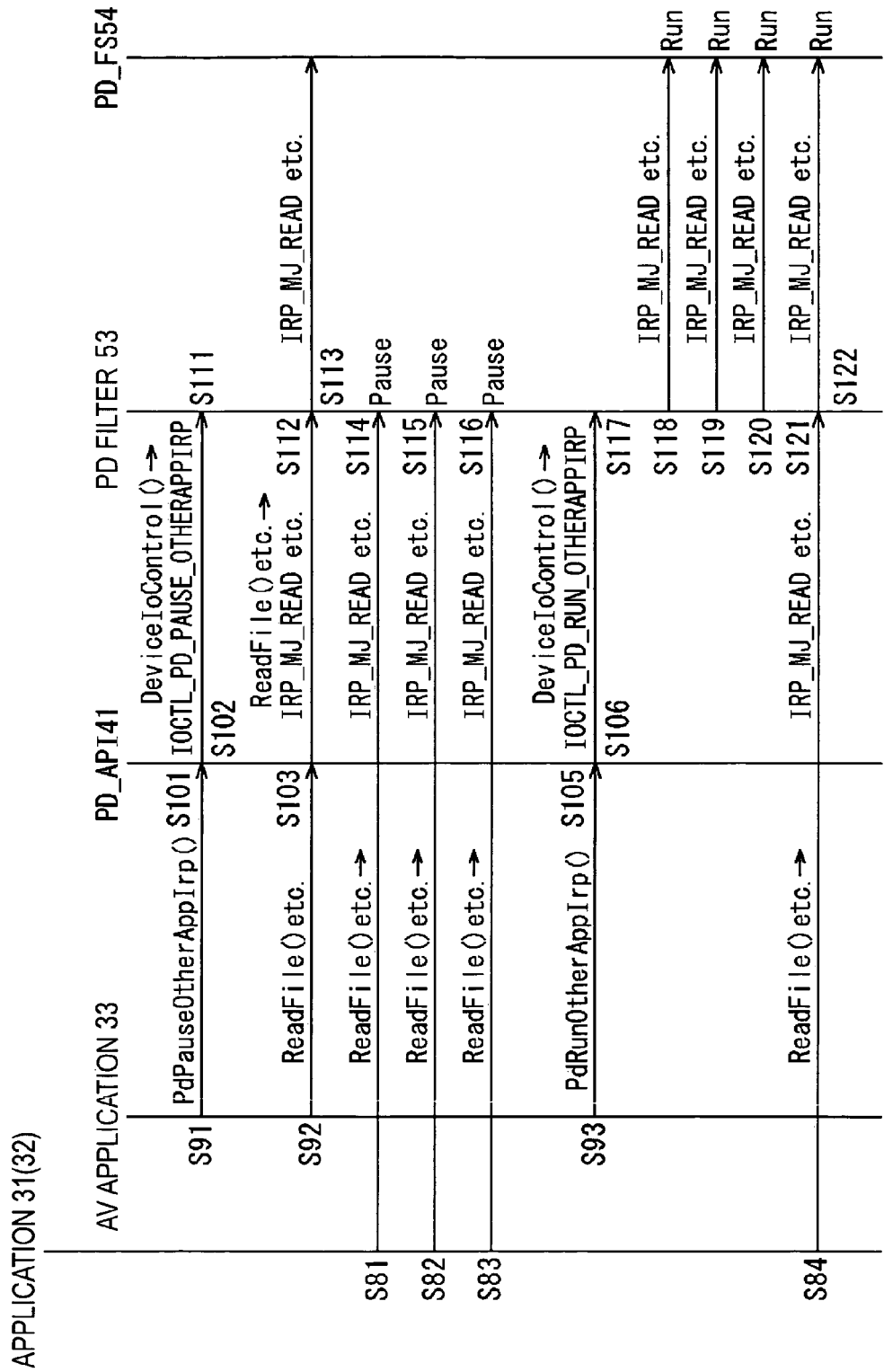
FIG. 14 is a flowchart illustrating processing performed by using the second function.

A description is now given, with reference to the flowchart of FIG. 14, of the overall processing by the AV application 33, the PD_API 41, and the PD filter 53 shown in FIG. 6 when the PD filter 53 implements the second function.

In response to a request to record or play back AV data on or from the optical disc 3 by the user operating the input unit 17 (FIG. 2), in step S91, the AV application 33 calls the API function PdPauseOtherAppIrp( ).

In step S101, the PD_API 41 receives the calling of the API function PdPauseOtherAppIrp( ) from the AV application 33. Then, in step S102, the PD_API 41 calls the API function DeviceIoControl( ) which requests the PD filter 53 to be in the pause state in response to the calling of the API function PdPauseOtherAppIrp( ) so that the IRP_MJ_DEVICE_CONTROL IRP having the IOCTL_PD_PAUSE_OTHERAPPIRP specified as the IOCTL requesting the PD filter 53 to be in the pause state is supplied to the PD filter 53 from the NT I/O manager 52.

In step S11, the PD filter 53 receives the IRP from the NT I/O manager 52 and sets the pause flag to be 1 according to the IOCTL_PD PAUSE_OTHERAPPIRP, thereby allowing the PD filter 53 to operate in the pause state.

In the pause state, the PD filter 53 interrupts the processing on IRPs requested by the processes other than the process 75 of the PD_API 41 and processes only IRPs requested by the process 75 of the PD_API 41.

If, in step S92, the AV application 33 calls the API function ReadFile( ) indicating a request to read a file as a request to access the optical disc 3, the PD_API 41 receives the calling of the API function ReadFile( ) in step S103.

In step S104, in response to the calling of the API function ReadFile( ) from the AV application 33, the PD_API 41 calls the same API function ReadFile( ) so that the IRP_MJ_READ IRP indicating a request to read a file is supplied to the PD filter 53 from the NT I/O manager 52.

In step S112, the PD filter 53 receives the IRP_MJ_READ IRP from the NT I/O manager 52. In step S113, the PD filter 53 stores the IRP received in step S112, i.e., the IRP requested by the process 75 of the PD_API 41, in the queue 81 (FIG. 6). The PD filter 53 then reads the IRP from the queue 81 and supplies it to the PD_FS 54.

As discussed above, IRPs from the process 75 of the AV application 33 are immediately processed.

On the other hand, if the processes 71 through 73 of the applications 31 and 32 other than the AV application 33 call the API function ReadFile( ) indicating a request to read a file as a request to access the optical disc 3 in steps S81 through S83, the IRP_MJ_READ IRP indicating a request to read a file is supplied to the PD filter 53 from the NT I/O manager 52.

In steps S114 through S116, the PD filter 53 receives the IRPs in response to the API function ReadFile( ) called in steps S81 through S83, and stores the IRPs in the queue 81.

In this case, since the PD filter 53 is in the pause state, the PD filter 53 does not process the IRPs stored in the queue 81 in steps S114 through S116, i.e., the IRPs from the processes 71 through 73 other than the process 75 of the AV application 33. That is, in the PD filter 53, the IRPs from the processes 71 and 72 of the application 31 and the process 73 of the application 32 remain stored in the queue 81 without being supplied to the PD_FS 54.

Then, in response to a request to stop the playback operation of the AV data recorded on the optical disc 3 or to finish the AV application 33 by the user operating the input unit 17, the AV application 33 calls the API function PdRunOtherAppIrp( ) in step S93.

In step S105, the PD_API 41 receives the calling of the API function PdRunOtherAppIrp( ) from the AV application 33. Then, in step S106, the PD_API 41 calls the API function DeviceIoControl( ) requesting the PD filter 53 to be in the run state in response to the calling of the API function PdRunOtherAppIrp( ) so that the IRP_MJ_DEVICE_CONTROL IRP having the IOCTL_PD_RUN_OTHERAPPIRP specified as the IOCTL requesting the PD filter 53 to be in the run state is supplied to the PD filter 53 from the NT I/O manager 52.

In step S117, the PD filter 53 receives the IRP from the NT I/O manager 52 and resets the pause flag according to the IOCTL_PD_RUN_OTHERAPPIRP to be 0 indicating the run state, thereby allowing the PD filter 53 to operate in the run state.

The PD filter 53 then starts (restarts) processing the IRPs from the processes other than the process 75 of the PD_API 41.

In this case, in the PD filter 53, the IRPs from the processes 71 through 73 received in steps S114 through S116 are still stored in the queue 81 without being processed.

Then, in steps S118 through S120, the PD filter 53 reads the IRPs from the processes 71 through 73 stored in the queue 81, and supplies them to the PD_FS 54.

Then, in step S84, when one of the processes 71 through 73 of the applications 31 and 32 other than the AV application 33 calls the API function ReadFile( ) indicating a request to read a file as a request to access the optical disc 3, the IRP_MJ_READ IRP indicating a request to read a file is supplied to the PD filter 53 from the NT I/O manager 52.

In step S121, the PD filter 53 receives the IRP in response to the API function ReadFile( ) called in step S84 by one of the processes 71 through 73 and stores the IRP in the queue 81.

In this case, since the PD filter 53 is in the run state, in step S122, it reads the IRP stored in the queue 81 in step S121 and supplies it to the PD_FS 54.

As discussed above, when the PD filter 53 is in the pause state, it outputs only IRPs from the AV application 33 to the PD_FS 54. When the PD filter 53 enters the run state from the pause state, it also outputs IRPs from the applications other than the AV application 33 to the PD_FS 54.

The processing performed by the PD filter 53 shown in FIG. 6 is described below with reference to the flowcharts of FIGS. 15 and 16.

Figure 15:
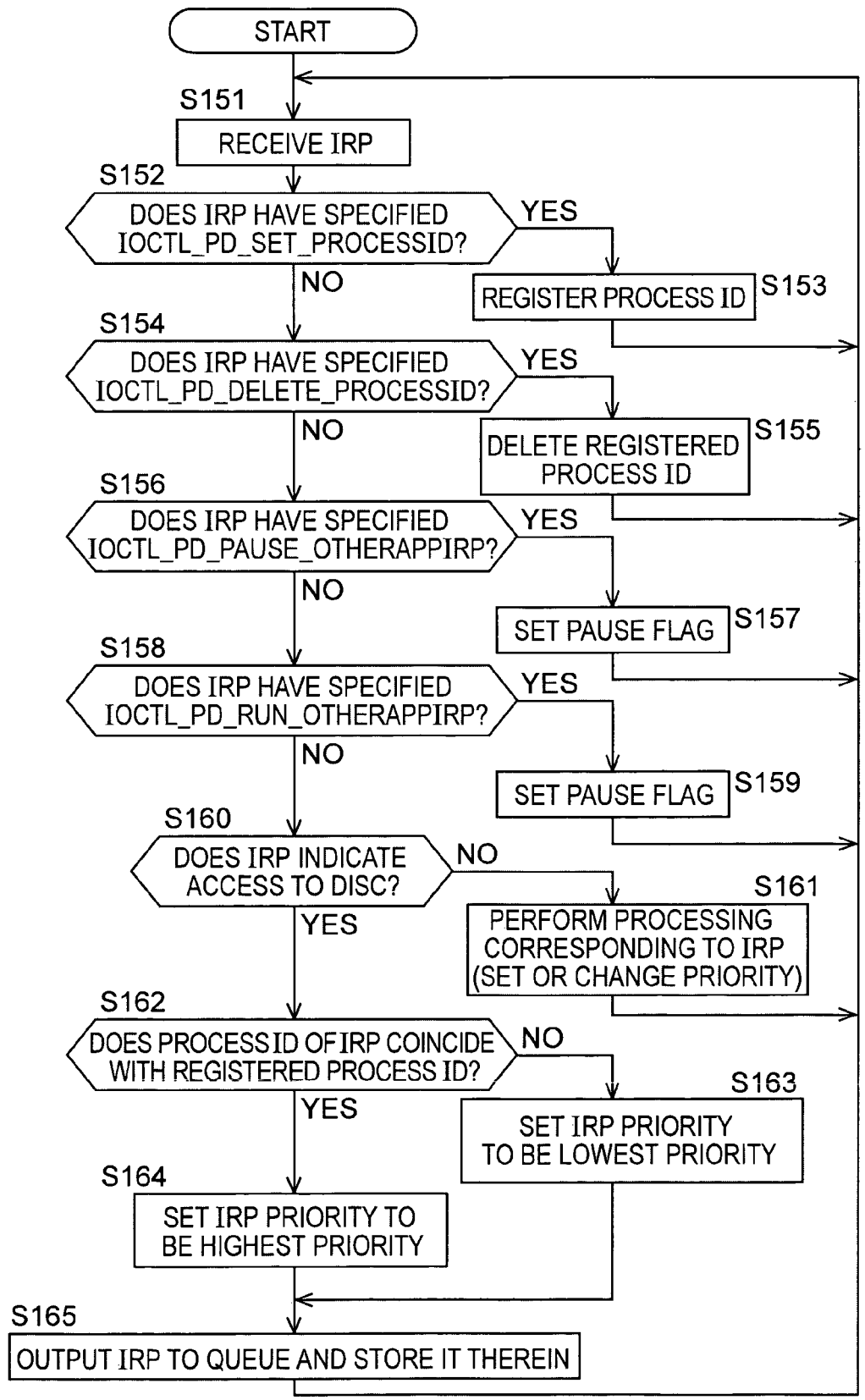
FIGS. 15 and 16 are flowcharts illustrating processing performed by using the second function.

Reference is first given to the flowchart of FIG. 15 to discuss the processing from when an IRP is received by the PD filter 53 shown in FIG. 6 provided with the second function to when the IRP is stored in the queue 81 (processing for inputting an IRP into the queue 81).

In FIG. 15, the processing similar to the processing described with reference to the flowchart of FIG. 10 is performed, except for steps S156 through S159 for setting the pause flag.

In response to the calling of the API function indicating a request to perform I/O-related processing on the drive 2 by one of the processes 71 through 75 of the applications 31 through 33, the Win32 subsystem 51 outputs a request to the NT I/O manager 52, and the NT I/O manager 52 supplies the IRP corresponding to the API function to the PD filter 53 in response to the request output from the Win32 subsystem 51.

In the PD filter 53, in step S151, the filter core 53A receives the IRP requested by the process that has called the API function from the NT I/O manager 52. In step S152, the filter core 53A determines whether the IRP is the IRP_MJ_DEVICE_CONTROL IRP having the IOCTL_PD_SET_PROCESSID (FIG. 8) specified as the IOCTL.

If it is determined in step S152 that the IRP received by the filter core 53A in step S151 is the IRP_MJ_DEVICE_CONTROL IRP having the IOCTL_PD_SET_PROCESSID specified as the IOCTL, the process proceeds to step S153. In step S153, the filter core 53A registers (stores) the process ID contained in the IRP, that is, the process ID of the process that has called the API function corresponding to the IRP, and waits for another IRP. The process then returns to step S151.

That is, in step S153, the process ID of the process that has called the API function corresponding to the IRP received by the filter core 53A in step S151 is registered (registered process ID).

If it is determined in step S152 that the IRP requested by the process is not the IRP having the IOCTL_PD_SET_PROCESSID specified as the IOCTL, the process proceeds to step S154 to determine whether the IRP is the IRP_MJ_DEVICE_CONTROL IRP having the IOCTL_PD_DELETE_PROCESSID (FIG. 8) specified as the IOCTL.

If it is determined in step S154 that the IRP is the IRP having the IOCTL_PD_DELETE_PROCESSID specified as the IOCTL, the process proceeds to step S155. In step S155, the filter core 53A deletes the registered process ID and waits for another IRP. The process then returns to step S11.

If it is determined in step S154 that the IRP is not the IRP having the IOCTL_PD_DELETE_PROCESSID specified as the IOCTL, the process proceeds to step S156 to determine whether the IRP is the IRP_MJ_DEVICE_CONTROL IRP having the IOCTL_PD_PAUSE_OTHERAPPIRP (FIG. 13) specified as the IOCTL.

If it is determined in step S156 that the IRP requested by the process is the IRP having the IOCTL_PD_PAUSE_OTHERAPPIRP specified as the IOCTL, the process proceeds to step S157. In step S157, the filter core 53A sets the pause flag, which is a variable, to be 1 indicating the pause state, and waits for another IRP. The process then returns to step S151. The filter core 53A (PD filter 53) then operates in the pause state.

If it is determined in step S156 that the IRP requested by the process is not the IRP having the IOCTL_PD_PAUSE_OTHERAPPIRP as the IOCTL, the process proceeds to step S158 to determine whether the IRP requested by the process is the IRP_MJ_DEVICE_CONTROL IRP having the IOCTL_PD_RUN_OTHERAPPIRP (FIG. 13) as the IOCTL.

If it is determined in step S158 that the IRP requested by the process is the IRP having IOCTL_PD_RUN_OTHERAPPIRP specified as the IOCTL, the process proceeds to step S159. In step S159, the filter core 53A resets the pause flag to be 0 indicating the run state, and waits for another IRP. The process then returns to step S151. The filter core 53A then operates in the run state.

If it is determined in step S158 that the IRP requested by the process is not the IRP having the IOCTL_PD_RUN_OTHERAPPIRP specified as the IOCTL, the process proceeds to step S160 to determine whether the IRP is the IRP indicating a request to access the optical disc 3.

If it is determined in step S160 that the IRP requested by the process is not the IRP indicating an access request, i.e., that the IRP is the IRP_MJ_DEVICE_CONTROL IRP having the IOCTL_PD_SET_PRIORITY (FIG. 8) specified as the IOCTL indicating a request to change the IRP priority set by the PD filter 53 or the IRP_MJ_DEVICE_CONTROL IRP having the IOCTL_PD_GET_PRIORITY (FIG. 8) specified as the IOCTL indicating a request to obtain the IRP priority set by the PD filter 53, the process proceeds to step S161. In step S161, as in step S57 of FIG. 10, the filter core 53A performs processing based on the IRP, and returns as a response the processing result to the process that has called the API function via the NT I/O manager 52 and the Win32 subsystem 51, and waits for another IRP. The process then returns to step S151.

If it is determined in step S160 that the IRP requested by the process is the IRP indicating an access request, i.e., that the IRP is the IRP_MJ_READ IRP indicating a request to read a file or the IRP_MJ_WRITE IRP indicating a request to write a file, the process proceeds to step S162. In step S162, the filter core 53A determines whether the process ID contained in the IRP requested by the process, i.e., the process ID of the process that has called the API function corresponding to the IRP, coincides with the registered process ID.

If it is determined in step S162 that the process ID contained in the IRP requested by the process does not coincide with the registered process ID, the process proceeds to step S163. In step S163, the filter core 53A sets the lowest IRP priority for the IRP requested by the process, and the process proceeds to step S165.

If it is determined in step S162 that the process ID contained in the IRP requested by the process coincides with the registered process ID, the process proceeds to step S164. In step S164, the filter core 53A sets the highest IRP priority for the IRP requested by the process, and the process proceeds to step S165.

In step S165, the filter core 53A outputs the IRP provided with the IRP priority set in step S163 or step S164 to the queue 81 and stores it therein, and waits for another IRP. The process then returns to step S151.

The processing (processing for outputting an IRP from the queue 81) performed on the IRP stored in the queue 81 by the PD filter 53 shown in FIG. 6 implementing the second function is described below with reference to the flowchart of FIG. 16.

In the PD filter 53, in step S171, the filter core 53A determines whether the pause flag is set to be 1.

If it is determined in step S171 that the pause flag is set to be 1, i.e., that the PD filter 53 is in the pause state, the process proceeds to step S172 to determine whether the highest IRP priority is set for the queue 81.

If it is determined in step S172 that the highest IRP priority is set for the queue 81, i.e., that the IRP requested by the process having the process ID that coincides with the registered process ID is stored in the queue 81, the process proceeds to step S173. In step S173, the filter core 53A processes the IRP having the highest IRP priority stored in the queue 81, and the process returns to step S171. That is, in step S173, the filter core 153A reads the IRP having the highest IRP priority from the queue 81 and outputs it to the PD_FS 54 via the NT I/O manager 52.

If it is determined in step S172 that no IRP having the highest IRP priority is stored in the queue 81, i.e., that the IRP requested by the process having the process ID that coincides with the registered process ID is not stored in the queue 81, the process returns to step S171 by skipping step S173.

Accordingly, if the PD filter 53 is in the pause state, the IRPs requested by the processes having the process IDs different from the registered process ID are not output to the PD_FS 54.

If it is determined in step S171 that the pause flag is reset to be 0, i.e., that the PD filter 53 is in the run state, the process proceeds to step S174.

More specifically, as in step S71, in step S174, the filter core 53A searches for the highest IRP priority from the IRPs stored in the queue 81.

As in step S72, in step S175, the filter core 53A processes the IRP having the highest IRP priority searched in step S174, and the process returns to step S171. More specifically, in step S175, the filter core 53A preferentially reads the IRP having the highest IRP priority from the queue 81 and outputs it to the PD_FS 54 via the NT I/O manager 52.

Figure 11:
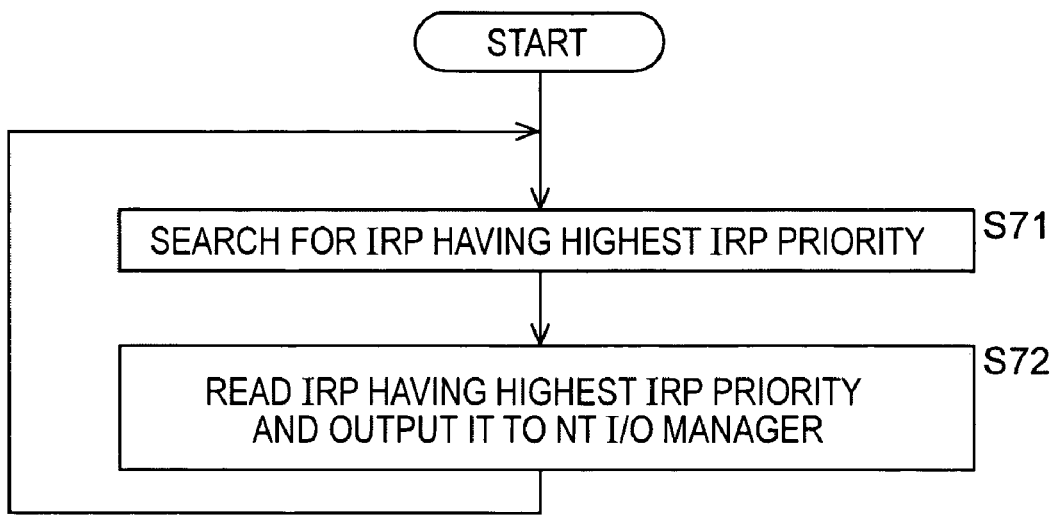

Accordingly, when the PD filter 53 is in the run state, as in FIG. 11, the PD filter 53 reads the IRPs from the queue 81 and outputs them to the PD_FS 54.

As discussed above, in the PD filter 53, the highest IRP priority is set for the IRP requested by the process having the process ID that is the same as the registered process ID, while the lowest IRP priority is set for the IRP requested by the process having the process ID different from the registered process ID.

The PD filter 53 stores the IRPs provided with the IRP priority in the queue 81. If the PD filter 53 is in the run state, it processes the IRPs stored in the queue 81 according to the IRP priority. If the PD filter 53 is in the pause state, it processes only the IRPs provided with the highest IRP priority, i.e., the IRPs requested by the process having the process ID that is the same as the registered process ID, among the IRPs stored in the queue 81.

Accordingly, in the AV application 33 (FIG. 6), the PD_API 41 loaded by the process 75 requests the PD filter 53 to register the process ID of the process 75. Additionally, when the AV application 33 records or plays back AV data, the PD_APL 41 requests the PD filter 53 to be in the pause state. With this arrangement, in the PD filter 53, the highest IRP priority is set for the IRPs requested by the process 75 of the PD_API 41, and only the IRPs provided with the highest IRP priority, i.e., only the IRPs requested by the process 75 of the PD_API 41, can be processed and output to the PD_FS 54.

Accordingly, only the IRPs requested by the process 75 of the PD_API 41 are processed. Thus, it is not necessary that the AV application 33 wait until the processing on the IRPs from the application 31 or 32 is finished or that a seek is required in the drive 2 caused by the processing on the IRPs from the application 31 or 32. As a result, the interruption of the reading and writing of data from and into the optical disc 3 by the AV application 33 can be prevented, and thus, AV data can be recorded or played back on or from the optical disc 3 in real time.

According to the first function, if IRPs requested by the process 75 of the PD_API 41 are not stored in the queue 81, it is possible that IRPs from the applications 31 and 32 be output from the PD filter 53 to the PD_FS 54. In contrast, according to the second function, if the PD filter 53 is set in the pause state, IRPs from the applications 31 and 32 are not output from the PD filter 53 to the PD_FS 54 even when the IRPs requested by the process 75 of the PD_API 41 are not stored in the queue 81.

Figure 16:
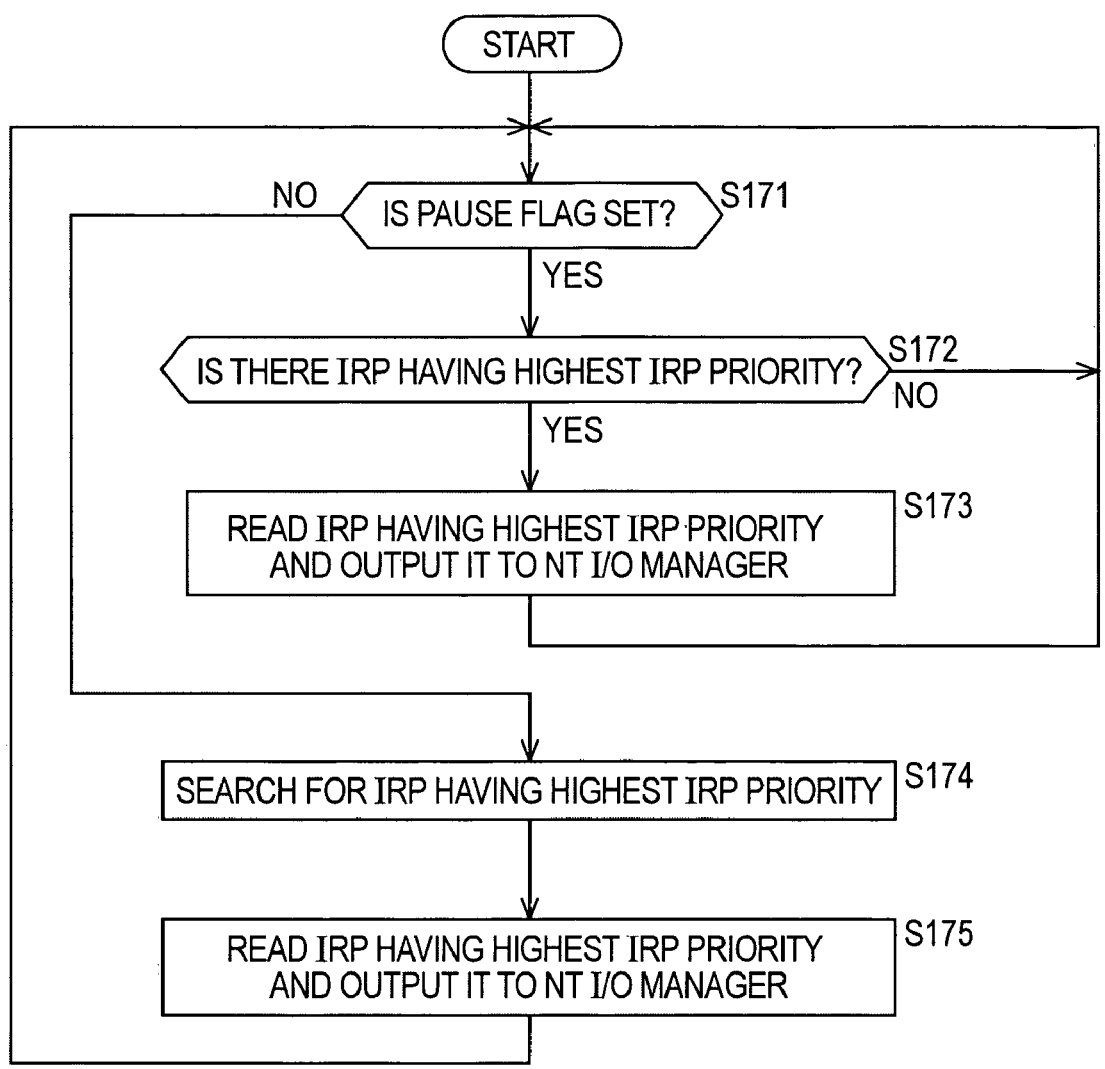

In the flowcharts of FIGS. 15 and 16, in the PD filter 53 in the pause state, only IRPs provided with the highest IRP priority are output to the PD_FS 54 as the specific IRPs. Alternatively, only IRPs having the process ID that coincides with the registered process ID may be output to the PD_FS 54 as the specific IRPS. That is, in the PD filter 53, only IRPs that are the same as the registered process ID may be output to the PD_FS 54 without setting the IRP priority.

The third function of the PD filter 53 for reliably reading and writing AV data in real time is described below.

More specifically, according to the third function, the PD filter 53 has a functional switch for turning ON or OFF the output of IRPs from applications other than the AV application 33, i.e., from the application 31 or 32, to the PD_FS 54, thereby preventing the IRPs from the application 31 or 32 from being output to the PD_FS 54. By using this function, the PD filter 53 outputs only IRPs from the AV application 33 without outputting IRPs from the application 31 or 32 to the PD_FS 54, thereby ensuring the real-time reading and writing of AV data by the AV application 33.

Figure 17:
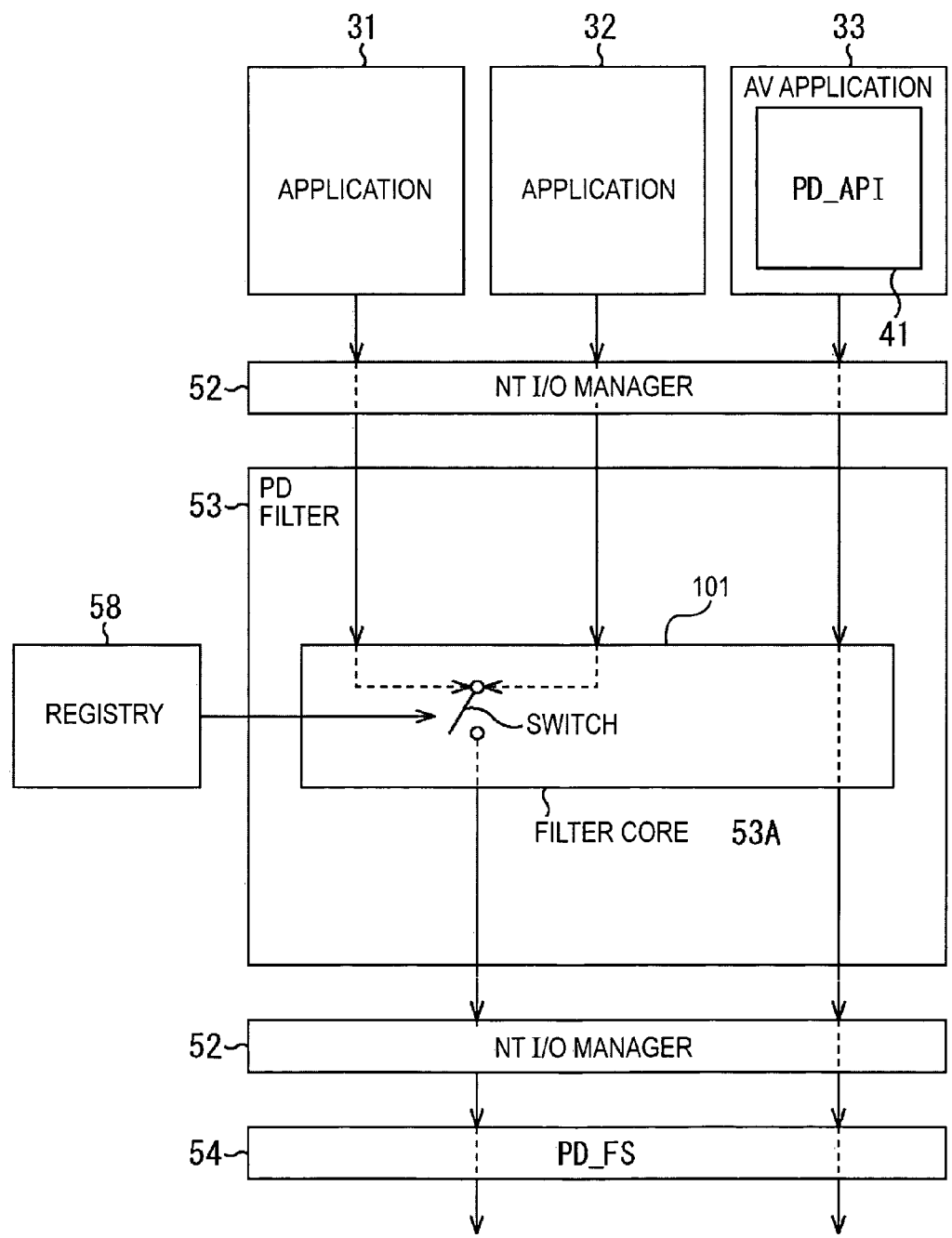
FIG. 17 is a block diagram illustrating an example of the configuration of the PD filter implementing a third function.

FIG. 17 illustrates an example of the configuration of the PD filter 53 implementing the above-described third function.

In FIG. 17, the filter core 53A of the PD filter 53 has a switch 101 for functionally turning ON or OFF the output of IRPs from the application 31 or 32 to the PD_FS 54.

When the OS 30 is run or when the optical disc 3 is installed in the drive 2, the switch 101 is turned ON or OFF according to switch setting information stored in the registry 58. It is difficult to change the state of the switch 101 after a volume corresponding to the drive 2 is mounted.

The switch setting information is stored in the registry 58 when the AV application 33 is installed. That is, when installing the AV application 33, the user is instructed to select whether the switch 101 is turned ON or OFF. The state of the switch 101 selected by the user is stored in the registry 58 as the switch setting information. The switch setting information stored in the registry 58 may be changed on an option setting screen for the AV application 33 after the AV application 33 is installed.

When the switch 101 is ON, the PD filter 53 outputs IRPs from all applications (applications 31 through 33 in FIG. 17) to the PD_FS 54.

When the switch 101 is OFF, the PD filter 53 outputs only IRPs from the PD_API 41 of the AV application 33, and disguises the file system of the volume corresponding to the optical disc 3 installed in the drive 2 for the other applications 31 and 32, thereby preventing the IRPs from the application 31 or 32 from being output to the PD_FS 54.

In this case, in response to an IRP from a process other than the PD_API 141, the switch 101 returns a status indicating that, although a volume is mounted, it is read only and there is no file or directory in the volume.

With this arrangement, when the switch 101 is OFF, the optical disc 3 installed in the drive 2 is handled as a volume that is not provided with files or directories and that is difficult to drop, eject, or format files on Windows® Explorer.

Figure 18:
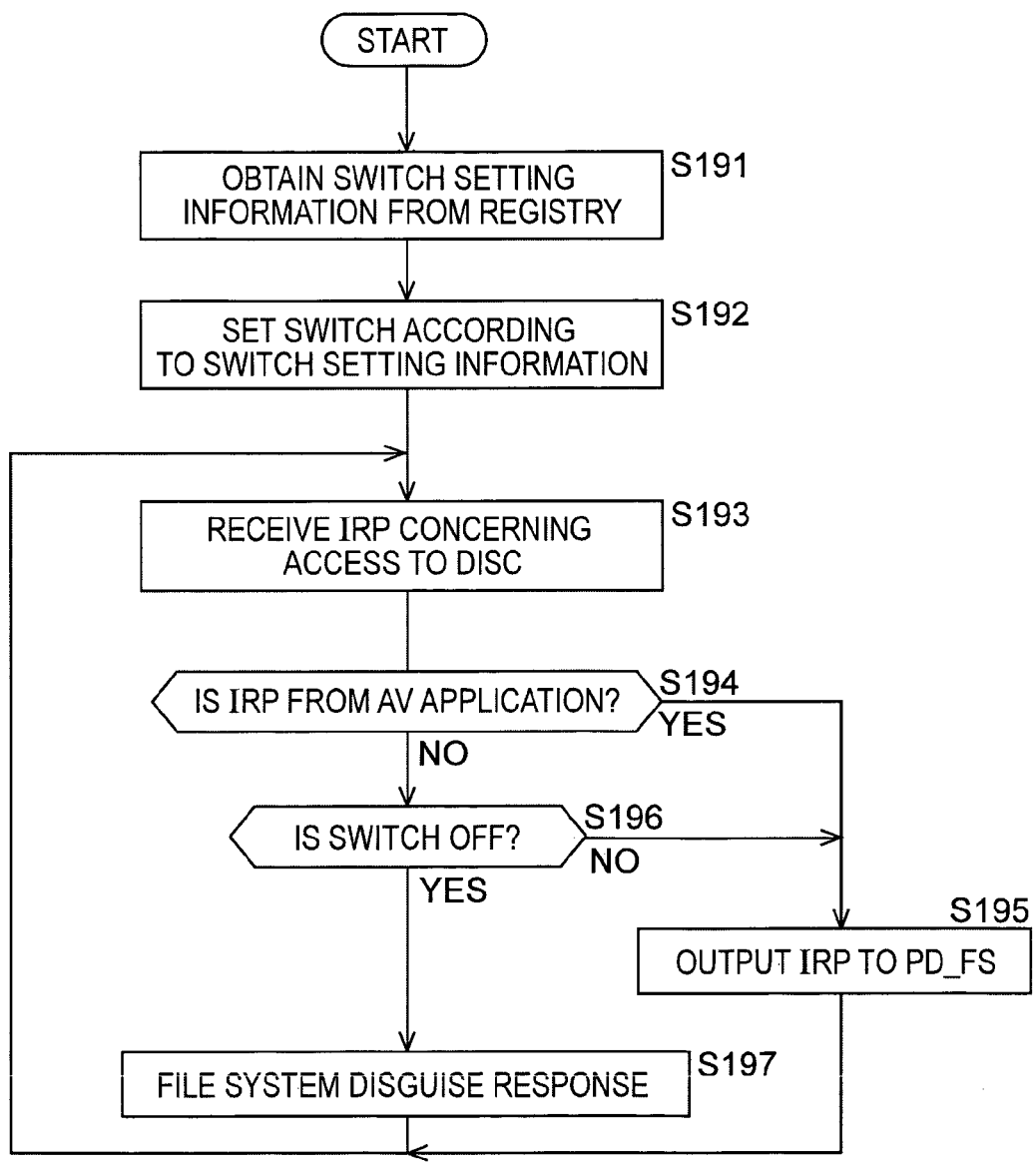
FIG. 18 is a flowchart illustrating processing performed by using the third function.

A description is now given of the processing by the PD filter 53 shown in FIG. 17 by using the third function with reference to the flowchart of FIG. 18.

When the OS 30 is started or when the optical disc 3 is installed in the drive 2, in step S191, the filter core 53A obtains the switch setting information from the register 58.

In step S192, the filter core 53A turns ON or OFF the switch 101 according to the switch setting information.

The filter core 53A then waits for an IRP from one of the applications 31 through 33, and receives the IRP in step S193.

In step S194, the filter core 53A determines whether the IRP received in step S193 is an IRP from the PD_API 141 of the AV application 33. If it is determined in step S194 that the IRP received in step S193 is an IRP from the AV application 33, the process proceeds to step S195. In step S195, the filter core 53A outputs the IRP to the PD_FS 54 and waits for another IRP from one of the applications 31 through 33. The process then returns to step S193.

If it is determined in step S194 that the IRP received in step S193 is not an IRP from the AV application 33, i.e., that the IRP received in step S193 is an IRP from the application 31 or 32, the process proceeds to step S196 to determine whether the switch 101 is OFF.

If it is determined in step S196 that the switch 101 is not OFF, i.e., that the switch 101 is ON, the process proceeds to step S195. In step S195, the filter core 53A outputs the IRP received in step S193 to the PD_FS 54 and waits for another IRP from one of the applications 31 through 33. The process then returns to step S193.

If it is determined in step S196 that the switch 101 is OFF, the process proceeds to step S197. In step S197, the switch 101 returns a file system disguise response in which a file system is disguised, i.e., the status indicating that, although a volume is mounted, it is read only without files or directories, to the application 31 or 32, which is the output source of the IRP received in step S193. The switch 101 then waits for another IRP from one of the applications 31 through 33. The process then returns to step S193, and the processing is similarly repeated.

As described above, in the PD filter 53, when the switch 101 is OFF, only IRPs from the application 33 are output to the PD_FS 54. Thus, it is not necessary that the AV application 33 wait until the processing on the IRPs from the application 31 or 32 is finished or that a seek is required in the drive 2 caused by the processing on the IRPs from the application 31 or 32. As a result, the interruption of the reading and writing of data from and into the optical disc 3 by the AV application 33 can be prevented, and thus, AV data can be recorded or played back on or from the optical disc 3 in real time.

A determination as to whether the IRP is an IRP from the AV application 33 in step S194 may be made by registering the process ID of the process 75 in the PD filter 53 in advance and by determining whether the process ID of the IRP coincides with the registered process ID.

In the above-described embodiment, the first through the third functions are all implemented on the PD filter 53. However, they may be implemented in the PD_FS 54.

The PD_FS 54 (FIG. 4) performs cache processing required for using the cache function of the NT cache manager 59 for the data requested by the IRP from the PD filter 53, as discussed in step S4 of FIG. 5.

If the data requested by the IRP from the PD filter 53 is cached in the NT cache manager 59, it is returned from the PD_FS 54 to the PD filter 53. If the data requested by the IRP from the PD filter 53 is not cached in the NT cache manager 59, it is output to the PD storage 55 from the PD_FS 54.

Accordingly, if the data requested by the IRP is not cached in the NT cache manager 59, an extra overhead is caused by the cache processing, i.e., by the execution of a routine for the cache processing, by the CPU 12 (FIG. 2) in comparison with the PC 1 without a cache function.

This overhead delays the output of the IRP from the PD_FS 54 to the PD storage 55, which further prevents the real-time recording or playback operation of AV data. It is thus desirable that no delay occurs in outputting IRPs from the AV application 33.

Such a delay can be prevented by not using the cache function.

If the cache function is not used at all, all IRPs from the PD filter 53 are output from the PD_FS 54 to the PD storage 55. That is, all IRPs from the applications 31 through 33 are output from the PD filter 53 to the PD storage 55 via the PD_FS 54.

More specifically, in this case, not only IRPs from the AV application 33, but also IRPs from applications other than the AV application 33, i.e., from the applications 31 and 32, are output from the PD filter 53 to the PD storage 55 via the PD_FS 54. Thus, a seek occurs due to the reading of data requested by IRPs from the application 31 or 32.

The occurrence of a seek prevents the real-time reading of AV data requested by the IRPs from the AV application 33.

When using the cache function, if data requested by the IRP from the application 31 or 32 is cached in the NT cache manager 59, the cached data is returned from the PD_FS 54 to the PD filter 53. In this case, the occurrence of a seek in the drive 2 caused by reading the data requested by the IRP from the application 31 or 32 from the optical disc 3 can be prevented.

Thus, in the AV application 33, a delay caused by performing the cache processing can be prevented by not using the cache function. As a result, the real-time recording or playback operation of AV data can be enhanced.

Conversely, in the applications 31 and 32 other than the AV application 33, the occurrence of a seek in the drive 2 can be reduced by using the cache function. As a result, the real-time recording or playback operation of AV data can also be enhanced.

Accordingly, in the PD filter 53, IRPs from the applications 31 and 32 are processed by using the cache function. On the other hand, for IRPs from the AV application 33, a cache ON/OFF function for setting whether the cache function is used is implemented so that IRPs from the AV application 33 can be processed according to the setting of the cache function.

Figure 19:
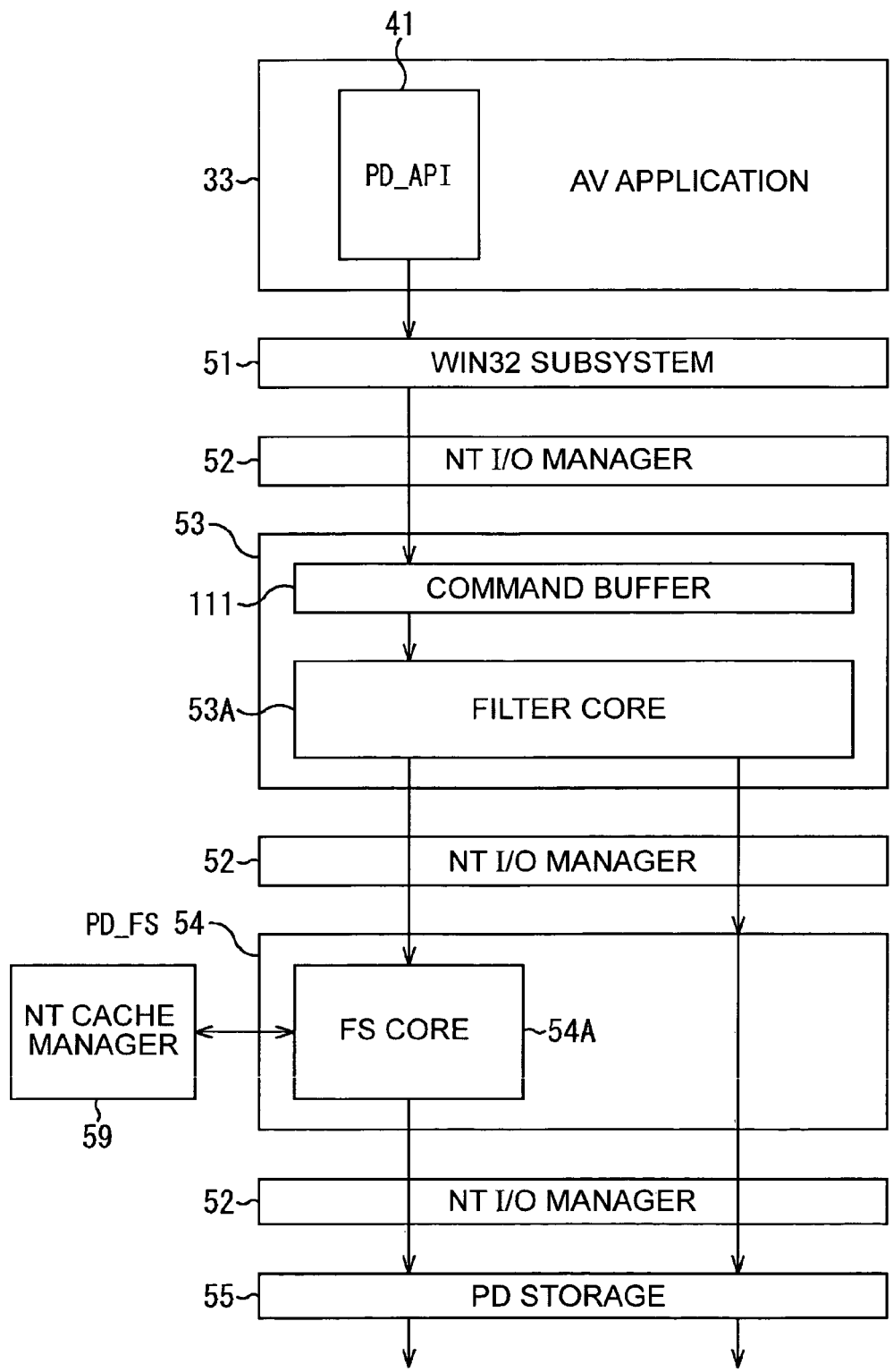
FIG. 19 is a block diagram illustrating an example of the configuration of the PD filter implementing a cache ON/OFF function.

FIG. 19 illustrates an example of the configuration of the PD filter 53 implementing the cache ON/OFF function.

The cache ON/OFF function is provided only for the AV application 33, which loads the PD_API 41, and the applications 31 and 32 always use the cache function. That is, the cache ON/OFF function is irrelevant to the applications 31 and 32. Accordingly, only the AV application 33 provided with the cache ON/OFF function is shown in FIG. 19.

In FIG. 19, the PD filter 53 has a command buffer 111. The command buffer 111 temporarily stores an IRP from the PD_API 41 of the AV application 33, i.e., an IRP output from the NT I/O manager 52 as a result of calling the API function by the PD_API 41.

In the PD filter 53 shown in FIG. 19, the filter core 53A sets whether the cache function is used by the PD_API 41 of the AV application 33, and processes IRPs from the AV application 33 stored in the command buffer 111 according to the setting result.

More specifically, if the cache function is used, the filter core 53A controls the output of the IRPs from the AV application 33 stored in the command buffer 111 to the PD_FS 54 so that the cache function is used in the PD_FS 54.

If the cache function is not used, the filter core 53A controls the output of the IRPs from the AV application 33 stored in the command buffer 111 to the PD_FS 54 so that the IRPs are directly output to the PD storage 55 without using the cache function in the PD_FS 54.

FIG. 20 illustrates API functions for allowing the PD_API 41 to control the PD filter 53 when using the cache ON/OFF function. The API functions are output to the AV application 33.

In FIG. 20, the API functions include four functions, i.e., PdOpenFile( ), PdCloseFile( ), PdReadFile( ), and PdwriteFile( ).

The above-described four functions are all file stream API functions for performing file handling. API functions similar to those four functions are provided in the Win32 subsystem 51.

That is, the PD_API 41 provides unique file stream API functions, such as PdOpenFile( ), PdCloseFile( ), PdReadFile( ), and PdWriteFile( ), separately from the file stream API functions provided by the Win32 subsystem 51.

The API function PdOpenFile( ) is the API function for requesting a file to be opened, and uses as the arguments the file name (including path name) of a file to be opened, the open mode (for example, the read only mode) when the file is opened, and cache information indicating whether the cache function is used.

By calling the API function PdOpenFile( ) by specifying the file name, open mode, and cache information as the arguments, the file of the file name specified by the argument is opened in the open mode specified by the argument. Additionally, the API function PdOpenFile( ) allows the filter core 53A of the PD filter 53 to set whether the cache function is used according to the cache information as the argument. In the API function PdOpenFile( ), when the opening of the file has succeeded, the file handle of the opened file is returned as the return value, and when the opening of the file has failed, 0xffffffff is returned as the return value. 0x indicates that the following values are hexadecimal.

The API function PdCloseFile( ) is the API function for requesting a file to be closed, and uses the file handle of a file to be closed as the argument. By calling the API function PdCloseFile( ) by specifying the file handle of a file to be closed as the argument, the file specified by the file handle is closed. In the API function PdCloseFile( ), when the closing of the file has succeeded, 1 is returned as the return value, and when the closing of the file has failed, 0 is returned as the return value.

The API function PdReadFile( ) is the API function for requesting data to be read from a file, and uses as the arguments the file handle of a file from which data is read, a buffer pointer, which is a pointer to a buffer for temporarily storing the data read from the file, and the number of bytes, which is the amount of data to be read from the file. By calling the API function PdReadFile( ) by specifying the file handle, the buffer pointer, and the number of bytes as the arguments, the data of the file specified by the file handle is read by the specified number of bytes and is stored in the storage area specified by the buffer pointer. In the API function PdReadFile( ), when the reading of data has succeeded, the number of bytes of the read data is returned as the return value, and when the reading of data has failed, 0 is returned as the return value. The API function PdReadFile( ) corresponds to the API function PdReadFile( ) provided by the Win32 subsystem 51.

The API function PdWriteFile( ) is the API function for requesting data to be written into a file, and uses as the arguments the file handle of a file into which data is written, a buffer pointer, which is a pointer to a buffer for temporarily storing data to be written into the file, and the number of bytes, which is the amount of data to be written into the file. By calling the API function PdWriteFile( ) by specifying the file handle, the buffer pointer, and the number of bytes as the arguments, data specified by the number of bytes is written into the file specified by the file handle at the storage area specified by the buffer pointer. In the API function PdWriteFile( ), when the writing of the data has succeeded, the number of bytes of the written data is returned as the return value, and when the writing of the data has failed, 0 is returned as the return value. The API function PdWriteFile( ) corresponds to the API function PdWriteFile( ) provided by the Win32 subsystem 51.

When the API function PdOpenFile( ), PdCloseFile( ), PdReadFile( ), or PdWriteFile( ) is called, the PD_API 41 calls the corresponding API function DeviceIoControl( ) provided by the Win32 subsystem 51.

Then, the Win32 subsystem 51 outputs a request in response to the API function DeviceIoControl( ) to the NT I/O manager 52, and the NT I/O manager 52 converts the request into the IRP_MJ_DEVICE_CONTROL IRP and supplies it to the PD filter 53.

As stated above, in this IRP_MJ_DEVICE_CONTROL, IOCTL is designated by the user-defined subcode.

Figure 21:
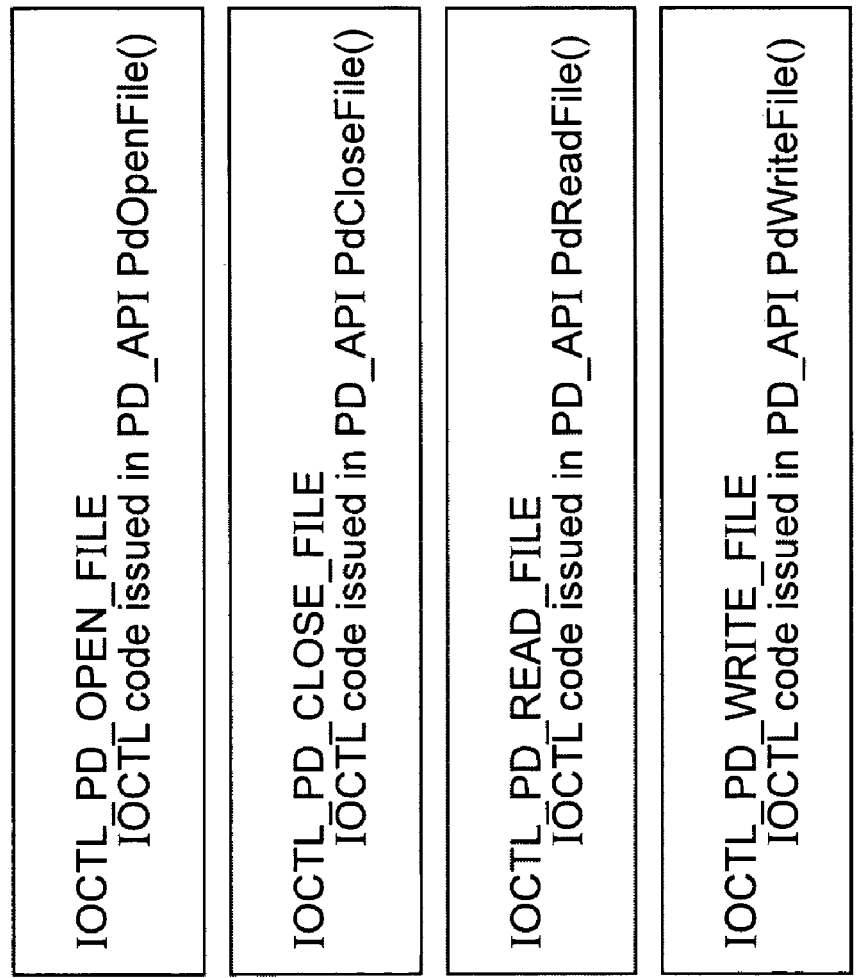
FIG. 21 illustrates user-defined IOCTL codes specified by IRP_MJ_DEVICE_CONTROL.

FIG. 21 illustrates the user-defined IOCTL specified by IRP_MJ_DEVICE_CONTROL when the API function PdOpenFile( ), PdCloseFile( ), PdReadFile( ), or PdWriteFile( ) is called.

In FIG. 21, four IOCTL (subcodes), i.e., IOCTL_PD_OPEN_FILE, IOCTL_PD_CLOSE_FILE, IOCTL_PD_READ_FILE, and IOCTL_PD_WRITE_FILE corresponding to the API functions PdOpenFile( ), PdCloseFile( ), PdReadFile( ), and PdWriteFile( ), respectively, shown in FIG. 20, are prepared as the user-defined IOCTL.

The IOCTL_PD_OPEN_FILE is IOCTL, which is the subcode of the IRP_MJ_DEVICE_CONTROL IRP associated with the API function DeviceIoControl( ) called in response to the API function PdOpenFile( ), requesting a file to be opened.

The IOCTL_PD_CLOSE_FILE is IOCTL, which is the subcode of the IRP_MJ_DEVICE_CONTROL IRP associated with the API function DeviceIoControl( ) called in response to the API function PdCloseFile( ), requesting a file to be closed.

The IOCTL_PD_READ_FILE is IOCTL, which is the subcode of the IRP_MJ_DEVICE_CONTROL IRP associated with the API function DeviceIoControl( ) called in response to the API function PdReadFile( ), requesting data to be read from a file.

The IOCTL_PD_WRITE_FILE is IOCTL, which is the subcode of the IRP_MJ_DEVICE_CONTROL IRP associated with the API function DeviceIoControl( ) called in response to the API function PdWriteFile( ), requesting data to be written into a file.

As stated above, the user-defined IOCTL, which is to be the subcode of the IRP_MJ_DEVICE_CONTROL IRP, is delivered to the NT I/O manager 52 by using the API function DeviceIoControl( ) provided by the Win32 subsystem 51 and is designated as the subcode of the IRP_MJ_DEVICE_CONTROL IRP by the NT I/O manager 52.

Figure 22:
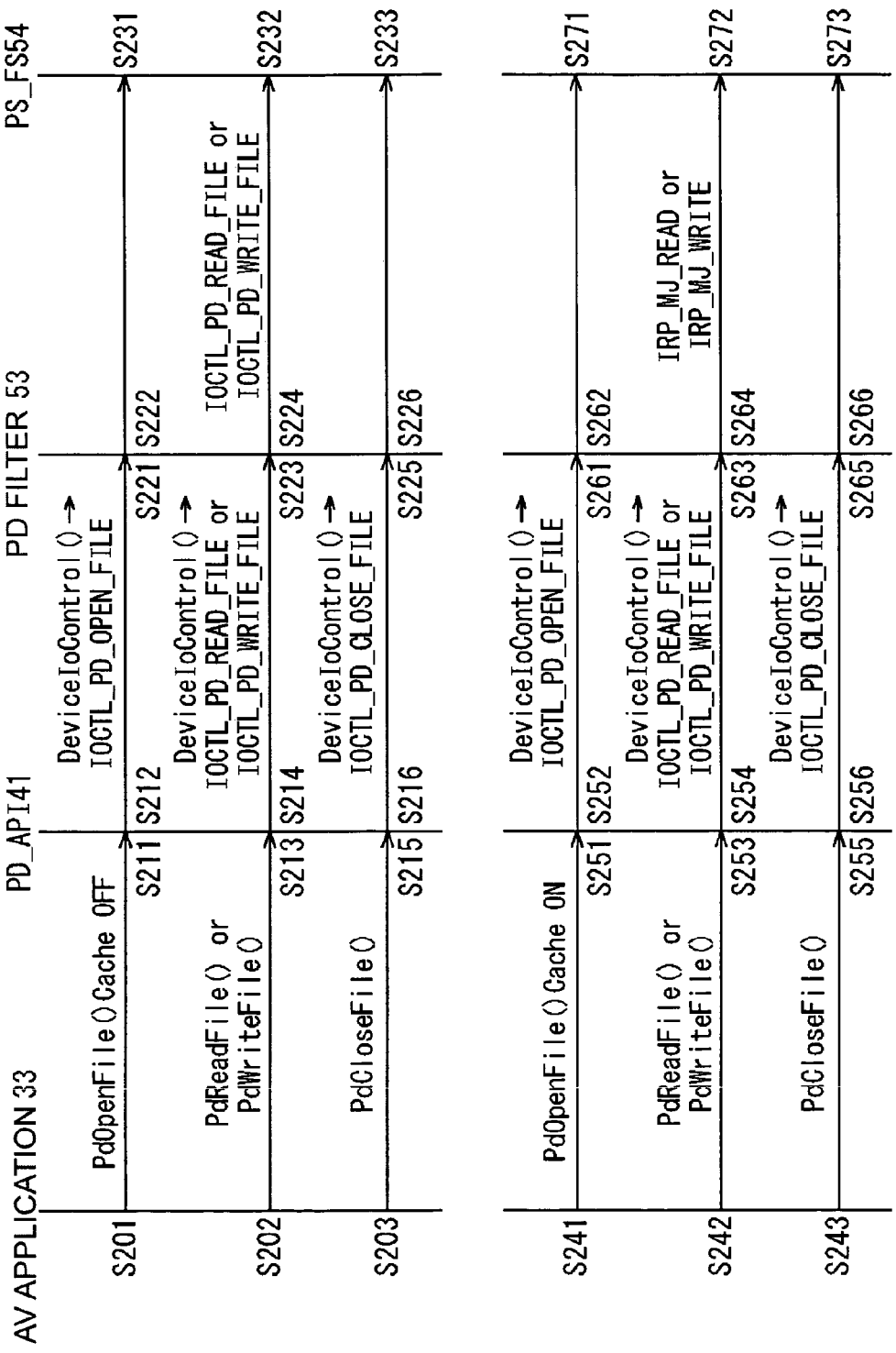
FIG. 22 is a flowchart illustrating processing performed by using the cache ON/OFF function.

The overall processing by the AV application 33, the PD_API 41, the PD filter 53, and the PD_FS 54 shown in FIG. 19 when the PD filter 53 implements the cache ON/OFF function is described below with reference to the flowchart of FIG. 22.

If the reading or writing of AV data on or into the optical disc 3 is performed without using the cache function, in step S201, the AV application 33 calls the API function PdOpenFile( ) requesting a file to be opened by using the cache information (cache OFF) indicating that the cache function is not used as the argument.

In step S211, the PD_API 41 receives the calling of the API function PdOpenFile( ) from the AV application 33. Then, in step S212, the PD_API 41 calls the API function DeviceIoControl( ) requesting a file to be opened in response to the calling of the API function PdOpenFile( ). Then, the NT I/O manager 52 supplies the IRP_MJ_DEVICE_CONTROL IRP having the IOCTL_PD_OPEN_FILE specified as the IOCTL requesting a file to be opened to the PD filter 53. In this case, the IOCTL_PD_OPEN_FILE contains cache information indicating that the cache function is not used.

In step S221, the PD filter 53 receives the IRP from the NT I/O manager 52 and resets the cache flag to be 0 indicating that the cache function is not used according to the IOCTL_PD_OPEN_FILE of the IRP. Accordingly, a file requested to be opened by specifying the cache information (cache OFF) as the argument in the AV application 33 is processed without using the cache function (cache OFF state).

In the cache OFF state, the PD filter 53 directly outputs to the PD_FS 54 the IRP_MJ_DEVICE_CONTROL IRP having the IOCTL_PD_OPEN_FILE, IOCTL_PD_CLOSE_FILE, IOCTL_PD_READ_FILE, or IOCTL_PD WRITE_FILE specified as the IOCTL associated with the API function DeviceIoControl( ) called in response to the PdOpen File( ), PdCloseFile( ), PdReadFile( ), or PdWriteFile( ), respectively, by the PD_API 41. Accordingly, the PD filter 53 controls the output of the IRP from the PD_API 41 so that data requested by the IRP from the PD_API 41 can be read or written without using the cache function.

That is, in step S221, after setting the cache OFF state, the PD filter 53 directly outputs the IRP_MJ_DEVICE_CONTROL IRP having the IOCTL_PD_OPEN_FILE specified as the IOCTL received from the NT I/O manager 52 to the PD_FS 54.

In step S231, the PD_FS 54 receives the IRP_MJ_DEVICE_CONTROL IRP having the IOCTL_PD_OPEN_FILE from the PD filter 53 and outputs it to the PD storage 55. Then, the file on the optical disc 3 is opened.

Subsequently, if, in step S202, the AV application 33 calls the API function PdReadFile( ) or PdWriteFile( ) requesting a file (file stream) to be read or written as a request to access the optical disc 3, the PD_API 41 receives the calling of the API function PdReadFile( ) or PdWriteFile( ) in step S213.

In step S214, the PD_API 41 calls the API function DeviceIoControl( ) requesting a file to be read or written in response to the API function PdReadFile( ) or PdWriteFile( ) from the AV application 33 so that the IRP_MJ_DEVICE_CONTROL IRP having the IOCTL_PD_READ_FILE specified as the IOCTL requesting a file to be read or the IRP having the IOCTL_PD_WRITE_FILE specified as the IOCTL requesting a file to be written is supplied to the PD filter 53 from the NT I/O manager 52.

In step S223, the PD filter 53 receives the IRP_MJ_DEVICE_CONTROL IRP from the NT I/O manager 52. In step S224, the PD filter 53 outputs the IRP_MJ_DEVICE_CONTROL IRP to the PD_FS 54.

As discussed above, the PD filter 53 in the cache OFF state directly outputs the IRP_MJ_DEVICE_CONTROL IRP from the PD_API 41 to the PD_FS 54.

Accordingly, in this case, in step S224, the PD filter 53 directly outputs the IRP_MJ_DEVICE_CONTROL IRP having the IOCTL_PD READ_FILE specified as the IOCTL requesting a file to be read or the IRP having the IOCTL_PD_WRITE_FILE specified as the IOCTL requesting a file to be written to the PD_FS 54.

In step S232, the PD_FS 54 receives the IRP_MJ_DEVICE_CONTROL IRP from the PD filter 53.

The PD_FS 54 provides the cache function of the NT cache manager 59 to the IRP_MJ_READ IRP or the IRP_MF_WRITE IRP output from the NT I/O manager 52 to the PD filter 53 in response to the calling of the API function ReadFile( ) or WriteFile( ) provided by the Win32 subsystem 51. In contrast, the PD_FS 54 does not provide the cache function to the IRP_MJ_DEVICE_CONTROL IRP.

Accordingly, in step S232, the PD_FS 54 directly outputs the IRP_MJ_DEVICE_CONTROL IRP from the PD filter 53 to the PD storage 55. That is, the cache function is not used.

Thereafter, if, in step S203, the AV application 33 calls the API function PdCloseFile( ) requesting the file which is requested to be opened in step S201 to be closed, the PD_API 41 receives the calling of the API function PdCloseFile( ) by the AV application 33 in step S215. Then, in step S216, the PD_API 41 calls the API function DeviceIoControl( ) requesting the file to be closed in response to the calling of the API function PdCloseFile( ) so that the IRP_MJ_DEVICE_CONTROL IRP having the IOCTL_PD_CLOSE_FILE specified as the IOCTL requesting the file to be closed is supplied to the PD filter 53 from the NT I/O manager 52.

In step S225, the PD filter 53 receives the IRP from the NT I/O manager 52. In step S226, the PD filter 53 directly outputs the IRP to the PD_FS 54.

In step S233, the PD_FS 54 receives the IRP_MJ_DEVICE_CONTROL IRP having the IOCTL_PD_CLOSE_FILE specified as the IOCTL from the PD filter 53, and outputs it to the PD storage 55. Then, the file on the optical disc 3 is closed.

On the other hand, if the reading or writing of AV data on or into the optical disc 3 is performed by using the cache function, in step S241, the AV application 33 calls the API function PdOpenFile( ) requesting a file to be opened by using the cache information (cache ON) indicating that the cache function is used as the argument.

In step S251, the PD_API 141 receives the calling of the API function PdOpenFile( ) by the AV application 33. Then, in step S252, the PD_API 141 calls the API function DeviceIoControl( ) requesting a file to be opened in response to the calling of the API function PdOpenFile( ) so that the IRP_MJ_DEVICE_CONTROL IRP having the IOCTL_PD_OPEN_FILE specified as the IOCTL requesting a file to be opened is supplied to the PD filter 53 from the NT I/O manager 52. In this case, the IOCTL_PD_OPEN_FILE contains cache information indicating that the cache function is used.

In step S261, the PD filter 53 receives the IRP from the NT I/O manager 52, and sets the cache flag to be 1 indicating that the cache function is used according to the IOCTL_PD_OPEN_FILE of the IRP. Accordingly, a file requested to be opened by specifying the cache information (cache ON) as the argument in the AV application 33 is processed by using the cache function (cache ON state).

In the cache ON state, the PD filter 53 controls data requested by the IRP from the PD_API 41 to be read or written by using the cache function.

That is, in step S261, after setting the cache ON state, the PD filter 53 outputs the IRP_MJ_DEVICE_CONTROL IRP having the IOCTL_PD_OPEN_FILE specified as the IOCTL received from the NT I/O manager 52 to the PD_FS 54.

In step S271, the PD_FS 54 receives the IRP_MJ_DEVICE_CONTROL IRP having the IOCTL_PD_OPEN_FILE specified as the IOCTL, and outputs it to the PD storage 55. Then, the file on the optical disc 3 is opened.

Thereafter, if, in step S242, the AV application 33 calls the API function PdReadFile( ) or PDWriteFile( ) requesting a file to be read or written as a request to access the optical disc 3, the PD_API 41 receives the calling of the API function PdReadFile( ) or PDWriteFile( ) in step S253.

In step S254, the PD_API 41 calls the API function DeviceIoControl( ) requesting a file to be read or written in response to the calling of the API function PdReadFile( ) or PDWriteFile ( ), respectively, from the AV application 33 so that the IRP_MJ_DEVICE_CONTROL IRP having the IOCTL_PD_READ_FILE specified as the IOCTL requesting a file to be read or the IRP having the IOCTL_PD_WRITE_FILE specified as the IOCTL requesting a file to be written is supplied to the PD filter 53 from the NT I/O manager 52.

In step S263, the PD filter 53 receives the IRP_MJ_DEVICE_CONTROL IRP from the NT I/O manager 52. In step S264, the PD filter 53 outputs the IRP_MJ_DEVICE_CONTROL IRP to the PD_FS 54.

In this case, the PD filter 53 in the cache ON state converts the IRP_MJ_DEVICE_CONTROL IRP having IOCTL_PD_READ_FILE or IRP_MJ_DEVICE_CONTROL IRP having the IOCTL_PD_WRITE_FILE, and outputs the converted IRP to the PD_FS 54.

In step S264, the IRP_MJ_DEVICE_CONTROL IRP having the IOCTL_PD_READ_FILE is converted into the IRP_MJ_READ output from the NT I/O manager 52 to the PD filter 53 in response to the calling of the API function ReadFile( ) for requesting a file to be read provided by the Win32 subsystem 51. The IRP_MJ_READ is then output to the PD_FS 54.

The IRP_MJ_DEVICE_CONTROL IRP having the IOCTL_PD_WRITE_FILE is converted into the IRP_MJ_WRITE output from the NT I/O manager 52 to the PD filter 53 in response to the calling of the API function WriteFile( ) for requesting a file to be written provided by the Win32 subsystem 51. The IRP_MJ_WRITE is then output to the PD_FS 54.

In step S272, the PD_FS 54 receives the IRP_MJ_READ or IRP_MJ_WRITE from the PD filter 53.

As stated above, the PD_FS 54 provides the cache function by the NT cache manager 59 to the IRP_MJ_READ or IRP_MJ_WRITE.

In step S272, the PD_FS 54 reads or writes data requested by the IRP_MJ_READ or IRP_MJ_WRITE received from the PD filter 53 by using the cache function.

More specifically, if the data requested to be read by the IRP_MJ_READ IRP from the PD filter 53 is cached in the NT cache manager 59, the PD_FS 54 returns the cached data to the PD filter 53 as a response. If the data to be read requested by the IRP_MJ_READ IRP is not cached in the NT cache manager 59, the PD_FS 54 outputs the IRP_MJ_READ IRP from the PD filter 53 to the PD storage 55.

Thereafter, if, in step S243, the AV application 33 calls the API function PdCloseFile( ) requesting the file which is requested to be opened in step S241 to be closed, the PD_API 141 receives the calling of the API function PdCloseFile( ) from the AV application 33 in step S255. Then, in step S256, the PD_API 141 calls the API function DeviceIoControl( ) requesting the file to be closed in response to the calling of the API function PdCloseFile( ) so that the IRP_MJ_DEVICE_CONTROL IRP having the IOCTL_PD_CLOSE_FILE requesting the file to be closed is supplied to the PD filter 53 from the NT I/O manager 52.

In step S265, the PD filter 53 receives the IRP from the NT I/O manager 52. In step S266, the PD filter 53 outputs the IRP to the PD_FS 54.

In step S273, the PD_FS 54 receives IRP_MJ_DEVICE_CONTROL IRP having the IOCTL_PD_CLOSE_FILE from the PD filter 53, and outputs it to the PD storage 55. Thus, the file on the optical disc 3 is closed.

It can be determined whether or not the cache function is used, which is indicated in the cache information used as the argument for calling the API function PdOpenFile( ) requesting a file to be opened, according to, for example, the performance of the PC 1 or the drive 2 (for example, the clock of the CPU 12 or the worst seek time of the drive 2) or the user operation.

Figure 23:
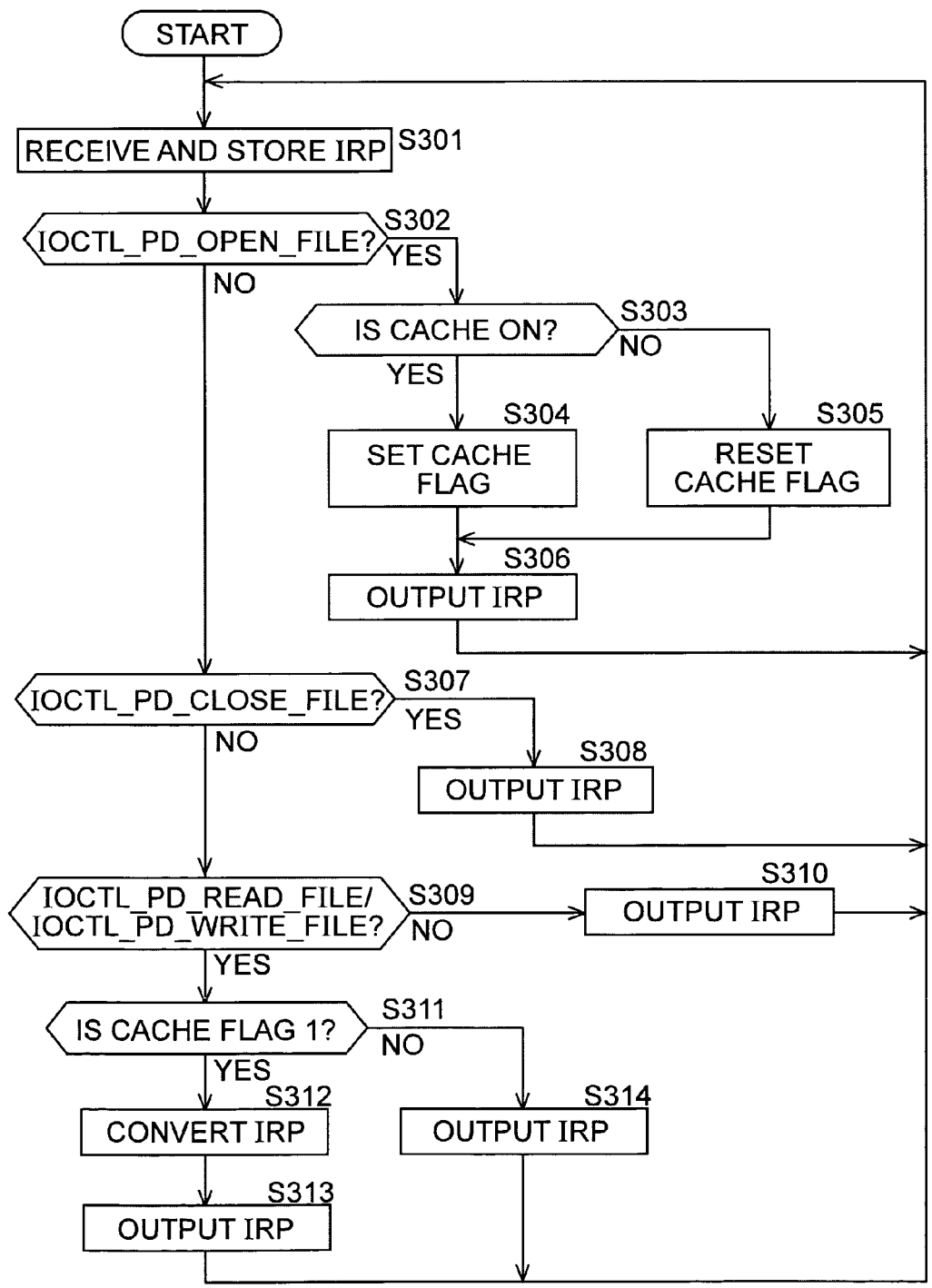
FIG. 23 is a flowchart illustrating processing performed by using the cache ON/OFF function.

The processing by the PD filter 53 shown in FIG. 19 by using the cache ON/OFF function is described below with reference to the flowchart of FIG. 23.

In response to the calling of the API function indicating a request to perform I/O-related processing on the drive 2 by one of the processes 71 through 75 of the applications 31 through 33, the NT I/O manager 52 supplies the TRP corresponding to the API function to the PD filter 53.

In this embodiment, the API functions called by the applications 31 through 33 (including the PD_API 41) include the API functions provided by the Win32 subsystem 51 and the API functions provided by the PD_API 41.

In response to the calling of an API function provided by the Win32 subsystem 51, the Win32 subsystem 51 outputs a request corresponding to the API function to the NT I/O manager 52, and the NT I/O manager 52 supplies the IRP corresponding to the API function to the PD filter 53. In response to the calling of an API function provided by the PD_API 41, the PD_API 41 calls the corresponding API function DeviceIoControl( ). The Win32 subsystem 51 then outputs a request in response to the API function DeviceIoControl( ) to the NT I/O manager 52, and the NT I/O manager 52 supplies the corresponding IRP to the PD filter 53.

Accordingly, regardless of whether the API function called by one of the applications 31 through 33 is the API function provided by the Win32 subsystem 51 or the API function provided by the PD_API 41, the IRP corresponding to the API function is eventually supplied to the PD filter 53 from the NT I/O manager 52.

In step S301, the PD filter 53 receives the IRP supplied from the NT I/O manager 52 and stores it in the command buffer 111. Then, in step S302, the filter core 53A determines whether the IRP stored in the command buffer 111 in step S301 is the IPR_MJ_DEVICE_CONTROL IRP having the IOCTL_PD_OPEN_FILE specified as the IOCTL.

As stated above, the IOCTL_PD_OPEN_FILE contains the cache information.

If it is determined in step S302 that the IRP stored in the command buffer 111 is the IRP having the IOCTL_PD_OPEN_FILE specified as the IOCTL, the process proceeds to step S303 to determine whether the cache information in the IOCTL_PD_OPEN_FILE specified by the IRP indicates that the cache function is used.

If it is determined in step S303 that the cache information indicates that the cache function is used, the process proceeds to step S304. In step S304, the filter core 53A sets the cache flag, which is a variable, to be 1 indicating that the cache function is used (cache ON state).

If it is determined in step S303 that the cache information indicates that the cache function is not used, the process proceeds to step S305. In step S305, the filter core 53A resets the cache flag to be 0 indicating that the cache function is not used (cache OFF state).

In step S306, the filter core 53A outputs the IRP having the IOCTL_PD_OPEN_FILE stored in the command buffer 111 to the PD_FS 54 and waits for another IRP. The process then returns to step S301.

In this case, the PD_FS 54 receives the IRP from the filter core 53A and outputs it to the PD storage 55. Then, the file is opened.

If it is determined in step S302 that the IRP stored in the command buffer 111 is not the IRP having the IOCTL_PD_OPEN_FILE specified as the IOCTL, the process proceeds to step S307 to determine whether the IRP stored in the command buffer 111 is the IRP_MJ_DEVICE_CONTROL IRP having the IOCTL_PD_CLOSE_FILE specified as the IOCTL requesting a file to be closed.

If it is determined in step S307 that the IRP stored in the command buffer 111 is the IRP having the IOCTL_PD_CLOSE_FILE, the process proceeds to step S308. In step S308, the filter core 53A outputs the IRP having the IOCTL_PD_CLOSE_FILE to the PD_FS 54 and waits for another IRP. The process then returns to step S301.

In this case, the PD_FS 54 receives the IRP having the IOCTL_PD_CLOSE_FILE and outputs it to the PD storage 55. Then, the file is closed.

If it is determined in step S307 that the IRP stored in the command buffer 111 is not the IRP having the IOCTL_PD_CLOSE_FILE, the process proceeds to step S309 to determine whether the IRP_MJ_DEVICE_CONTROL IRP stored in the command buffer 111 is the IRP_MJ_DEVICE_CONTROL IRP having the IOCTL_PD_READ_FILE or the IRP_MJ_DEVICE_CONTROL IRP having the IOCTL_PD_WRITE_FILE.

If it is determined in step S309 that the IRP stored in the command buffer 111 is not the IRP having the IOCTL_PD_READ_FILE or the IRP having the IOCTL_PD_WRITE_FILE, the process proceeds to step S310. In step S310, the filter core 53A supplies the IRP stored in the command buffer 111 to the PD_FS 54 and waits for another IRP. The process then returns to step S301.

If it is determined in step S309 that the IRP stored in the command buffer 111 is the IRP having the IOCTL_PD_READ_FILE or IOCTL_PD_WRITE_FILE, the process proceeds to step S311 to determine whether the cache flag is 1.

If it is determined in step S311 that the cache flag is 1, i.e., that the filter core 53A of the PD filter 53 is in the cache ON state, the process proceeds to step S312. In step S312, the filter core 53A converts the IRP stored in the command buffer 111.

That is, in this case, the IRP stored in the command buffer 111 is the IRP_MJ_DEVICE_CONTROL IRP having the IOCTL_PD_READ_FILE specified as the IOCTL requesting a file to be read or the IRP_MJ_DEVICE_CONTROL IRP having the IOCTL_PD_WRITE_FILE specified as the IOCTL requesting a file to be written.

If the IRP stored in the command buffer 111 is the IRP_MJ_DEVICE_CONTROL IRP having the IOCTL_PD_READ_FILE specified as the IOCTL, in step S312, the filter core 53A converts the IRP_MJ_DEVICE_CONTROL IRP into the IRP_MJ_READ IRP which is output from the NT I/O manager 52 to the PD filter 53 in response to the calling of the API function ReadFile( ) provided by the Win32 subsystem 51.

If the IRP stored in the command buffer 111 is the IRP_MJ_DEVICE_CONTROL IRP having the IOCTL_PD_WRITE_FILE specified as the IOCTL, in step S312, the filter core 53A converts the IRP_MJ_DEVICE_CONTROL IRP into the IRP_MJ_WRITE IRP which is output from the NT I/O manager 52 to the PD filter 53 in response to the calling of the API function WriteFile( ) provided by the Win32 subsystem 51.

Then, in step S313, the filter core 53A outputs the IRP converted in step S312, i.e., the IRP_MJ_READ or IRP_MJ_WRITE, to the PD_FS 54, and waits for another IRP. The process then returns to step S301.

In this case, the PD_FS 54 receives the IRP_MJ_READ or IRP_MJ_WRITE from the filter core 53A, and reads or writes the data requested by the IRP by using the cache function.

As discussed above, the PD_FS 54 provides the cache function by the NT cache manager 59 to the IRP_MJ_READ or IRP_MJ_WRITE.

Accordingly, if the IRP received from the filter core 53A is the IRP_MJ_READ, the PD_FS 54 checks whether the data requested by the IRP to be read is cached in the NT cache manager 59. If the data is cached in the NT cache manager 59, the PD_FS 54 returns the cached data to the PD filter 53 as a response. If the data requested by the IRP_MJ_READ is not cached in the NT cache manager 59, the PD_FS 54 outputs the IRP_MJ_READ IRP to the PD storage 55.

The PD storage 55 includes a read/write buffer for reading or writing data (not shown). The read/write buffer size is equal to the page size used for paging, for example, 4 KB, and the maximum size of data that can be read or written at one time is restricted by this read/write buffer size.

Accordingly, if the data size requested to be read by the IRP_MJ_READ from the filter core 53A exceeds the read/write buffer size, the PD_FS 54 divides the IRP_MJ_READ IRP into a plurality of IRP_MJ_READ IRPs requesting a data size within the read/write buffer size to be read, and outputs the IRPs to the PD storage 55. The same applies to the IRP_MJ_WRITE IRP from the filter core 53A.

If it is determined in step S311 that the cache flag is not 1, i.e., that the cache flag is 0 and the filter core 53A of the PD filter 53 is in the cache OFF state, the process proceeds to step S314. In step S314, the filter core 53A directly outputs the IRP stored in the command buffer 111, i.e., the IRP_MJ_DEVICE_CONTROL IRP having the IOCTL_PD_READ_FILE requesting a file to be read or the IRP_MJ_DEVICE_CONTROL IRP having the IOCTL_PD_WRITE_FILE requesting a file to be written, to the PD_FS 54, and waits for another IRP. The process then returns to step S301.

In this case, the PD_FS 54 receives the IRP_MJ_DEVICE_ CONTROL IRP having the IOCTL_PD_READ_FILE or the IOCTL_PD_WRITE_FILE, and immediately outputs the IRP to the PD storage 55 without using the cache function.

As stated above, the maximum data size to be read or written at one time is restricted by the read/write buffer size of the PD storage 55.

Accordingly, if the data size requested to be read or written by the IRP_MJ_DEVICE_CONTROL IRP to be output to the PD_FS 54 in step S314 exceeds the read/write buffer size, the filter core 53A divides the IRP_MJ_DEVICE_CONTROL IRP into a plurality of IRP_MJ_DEVICE_CONTROL IRPs requesting a data having a size within the read/write buffer size to be read or written, and outputs the IRPs to the PD_FS 54.

It can be selected whether or not the cache function is used by the cache ON/OFF function only for the IRP_MJ_DEVICE_CONTROL IRPs having the user-defined IOCTL codes shown in FIG. 21. The IRPs having the IOCTL are output from the NT I/O manager 52 to the PD filter 53 in response to the calling of the API functions shown in FIG. 20 provided by only the PD_API 41.

Accordingly, in this embodiment, the application that can use the cache ON/OFF function is restricted to the AV application 33 loading the PD_API 41.

If the cache function is not used in the AV application 33, a delay in processing an IRP from the AV application 33 caused by the overhead by the cache processing on the IRP can be prevented, thereby enhancing the real-time recording or playback operation of AV data by the AV application 33.

On the other hand, the other applications 31 and 32 request the reading or writing of data by directly calling the API function ReadFile( ) or WriteFile( ) provided by the Win32 subsystem 51. Accordingly, the applications 31 and 32 always use the cache function to read or write data.

By the use of the cache function, the frequency of the output of IRPs from the application 31 or 32 to the PD storage 55 from the PD_FS 54 is reduced. It is thus possible to prevent the occurrence of a seek in the drive 2 caused by reading or writing data requested by an IRP from the application 31 or 32. It is also possible to prevent a seek in the drive 2 caused by reading or writing data requested by an IRP from the AV application 33 after reading or writing data requested by the IRP from the application 31 or 32. As a result, the real-time recording or playback operation of AV data by the AV application 33 can also be improved.

One of the above-described first through third functions may be combined with the cache ON/OFF function.

Figure 24:
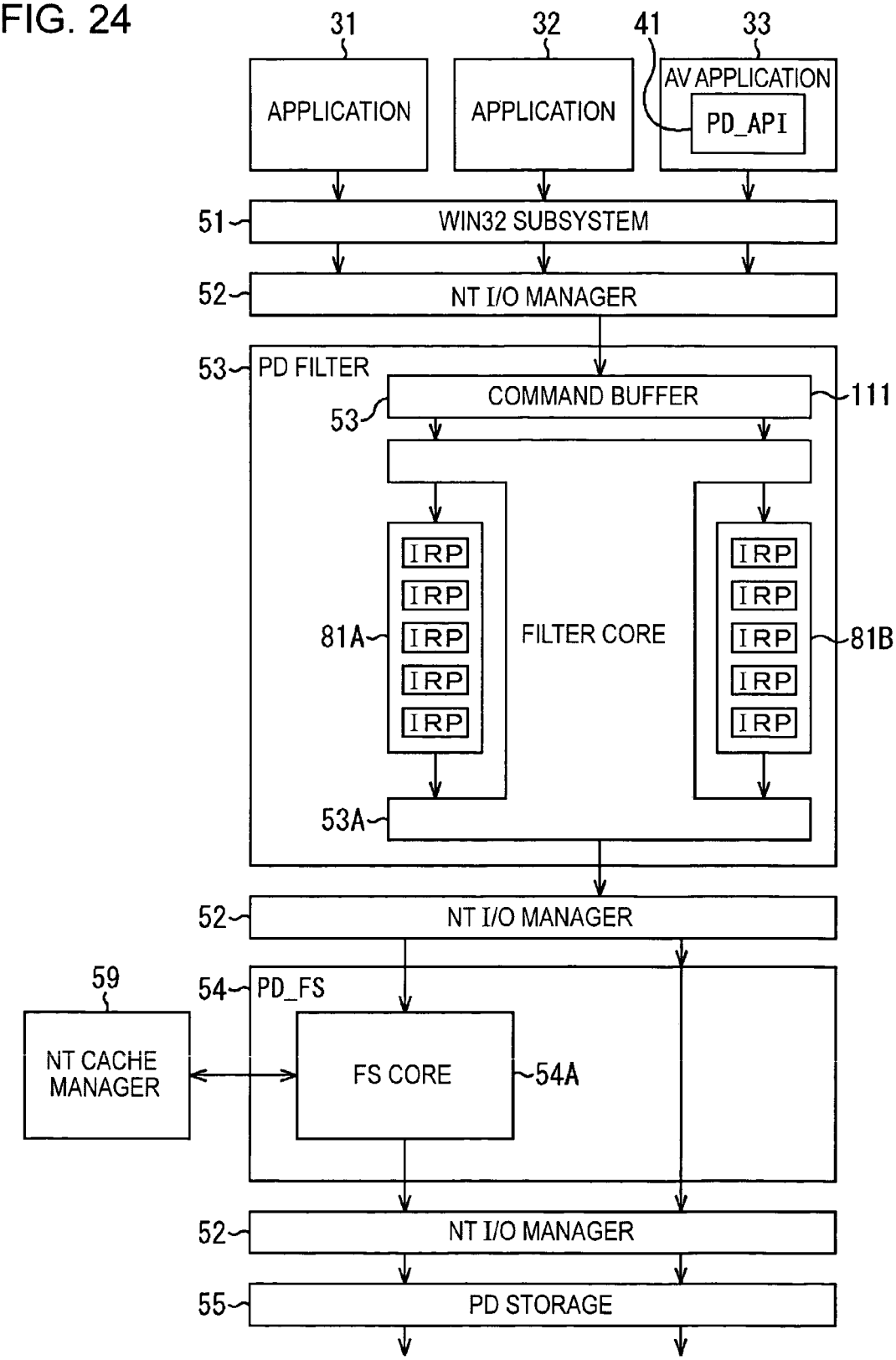
FIG. 24 is a block diagram illustrating an example of the configuration of the PD filter used by combining one of the first and second functions and the cache ON/OFF function.

FIG. 24 illustrates an example of the configuration of the PD filter 53 when one of the first and second functions is combined with the cache ON/OFF function.

In FIG. 24, by using the first function, the PD filter 53 sets the IRP priority for an IRP indicating a request to access the optical disc 3 from one of the applications 31 through 33, and stores the IRP provided with the IRP priority in the queue 81. Then, the PD filter 53 reads the IRP stored in the queue 81 according to the IRP priority set for the IRP, and outputs the IRP to the PD_FS 54.

Alternatively, by using the second function, the PD filter 53 sets a pause flag indicating whether the processing on an IRP indicating a request to access the optical disc 3 is allowed or prohibited, and stores the IRPs from the applications 31 through 33 in the queue 81. Then, the PD filter 53 reads the IRPs stored in the queue 81 according to the pause flag and outputs them to the PD_FS 54.

Additionally, the PD filter 53 sets whether the cache function is used for an IRP from the AV application 33, and when outputting the IRP to the PD_FS 54, the PD filter 53 processes the IRP according to the above setting.

Figure 25:
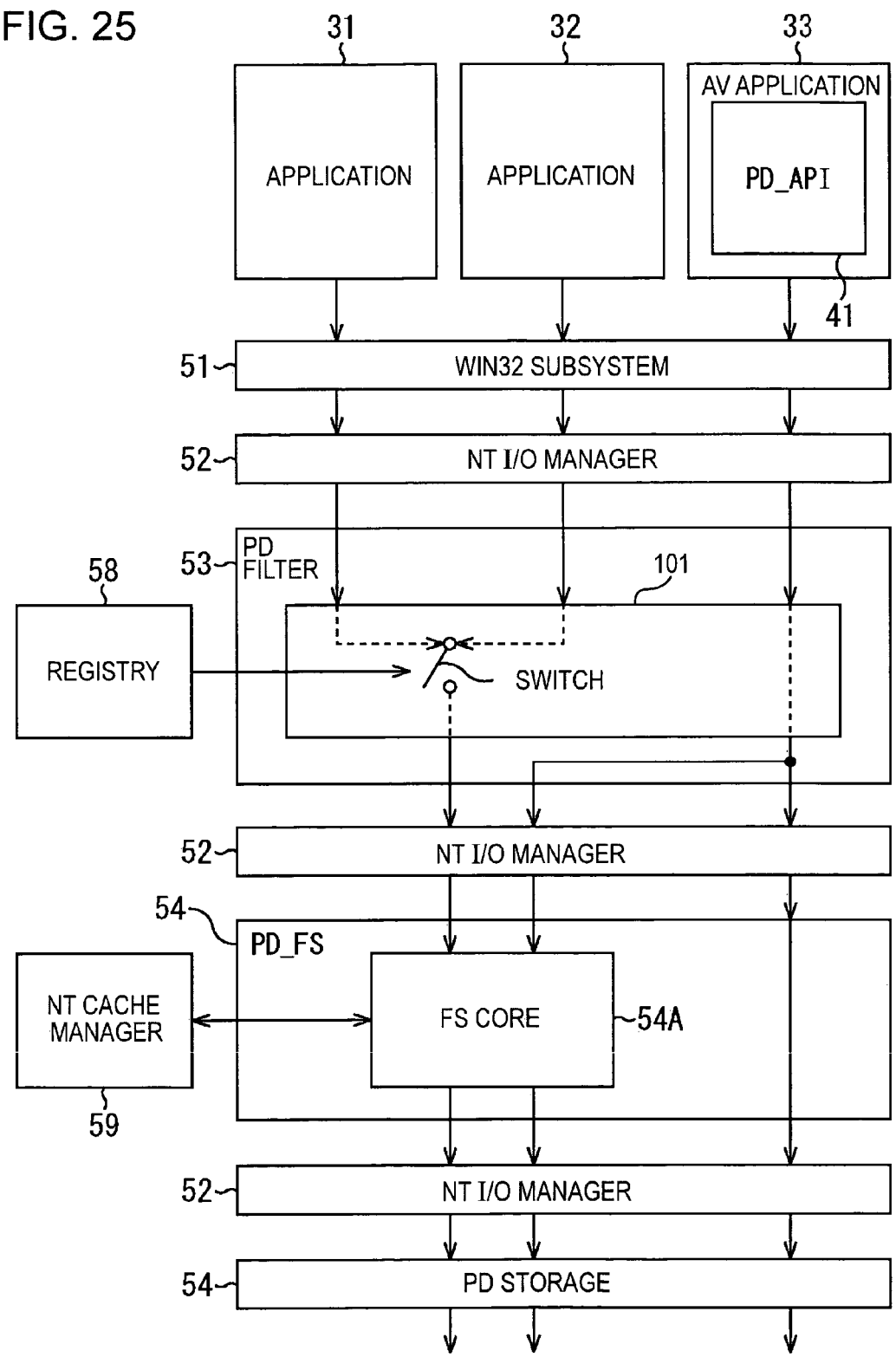
FIG. 25 is a block diagram illustrating an example of the configuration of the PD filter used by combining the third function and the cache ON/OFF function.

FIG. 25 illustrates an example of the configuration of the PD filter 53 when the third function is combined with the cache ON/OFF function.

In FIG. 25, by using the third function, the PD filter 53 has the switch 101 for functionally turning ON or OFF the output from an IRP from applications other than the AV application 33, i.e., from the application 31 or 32, to the PD_FS 54, and turns ON or OFF the switch 101 according to the switch setting information stored in the registry 58, thereby controlling the output of the IRPs from the applications 31 and 32 to the PD_FS 54.

Additionally, the PD filter 53 sets whether the cache function is used for an IRP from the AV application 33, and when outputting the IRP to the PD_FS 54, the PD filter 53 processes the IRP according to the above setting.

As described above, by the combination of one of the first through third functions with the cache ON/OFF function, a seek caused by accessing the optical disc 3 by the application 31 or 32 can be prevented, thereby ensuring the real-time recording or playback operation of AV data by the application 33.

In the above-described embodiment, as the recording medium used for recording or playing back data, the optical disc 3 is used. However, another type of recording medium, such as a hard disk or another type of disc-shaped recording medium, that may cause a seek by a recording or playback operation of data, may be used.

In this specification, it is not necessary that steps forming programs for allowing the PC 1 to perform various types of processing be executed in chronological order described in the flowcharts. They may be executed in parallel or individually (for example, parallel processing or object processing).

It should be understood by those skilled in the art that various modifications, combinations, sub-combinations and alterations may occur depending on design requirements and other factors insofar as they are within the scope of the appended claims or the equivalents thereof.

What is claimed is:

1. A product comprising at least one computer-readable medium that stores a program that when executed is operative in implementing a method allowing a computer to process an access request to access a recording medium from an application, the method comprising:

setting a priority unique to the access request from the application or permission information indicating whether or not processing on the access request from the application is permitted, the priority and the permission information each being indicative of a preference for processing the access request over another access request to access the recording medium, wherein the setting of the priority or the permission information (i) is performed for each access request that is directed to the recording medium, (ii) is independent of a priority setting function that is applicable to the application accessing resources other than the recording medium, such that the setting of the priority or permission information does not influence priority setting for the use, associated with execution of the application, of resources other than the recording medium, the resources other than the recording medium including random access memory, and (iii) is capable of being performed for each of at least two access requests that are from respective applications and that request access to a common volume of the recording medium, and wherein the setting of the priority or the permission information includes storing data that corresponds to and is distinct from the access request and that represents the priority of the access request;

storing the access request provided with the priority or the permission information in a queue; and processing the access request stored in the queue in an order relative to other access requests stored in the queue according to the priority or the permission information, such that the access request is processed to access the storage medium prior to another of the other access requests stored in the queue prior to the storing of the access request.

2. A program recording medium recording thereon a program allowing a computer to process an access request to access a recording medium from an application, the program when executed being operative to cause the computer to carry out a method comprising:

setting a priority unique to the access request from the application or permission information indicating whether or not processing on the access request from the application is permitted, the priority and the permission information each being indicative of a preference for processing the access request over another access request to access the recording medium, wherein the setting of the priority or the permission information (i) is performed for each access request that is directed to the recording medium, (ii) is independent of a priority setting function that is applicable to the application accessing resources other than the recording medium, such that the setting of the priority or permission information does not influence priority setting for the use, associated with execution of the application, of resources other than the recording medium, the resources other than the recording medium including random access memory, and (iii) is capable of being performed for each of at least two access requests that are from respective applications and that request access to a common volume of the recording medium;

storing the access request provided with the priority or the permission information in a queue; and processing the access request stored in the queue in an order relative to other access requests stored in the queue according to the priority or the permission information, such that the access request is processed to access the storage medium prior to another of the other access requests stored in the queue prior to the storing of the access request.

3. An information processing apparatus for processing an access request to access a recording medium from an application, comprising:

a setting unit that is operable in setting a priority unique to the access request from the application or permission information indicating whether or not processing on the access request from the application is permitted, the priority and the permission information each being indicative of a preference for processing the access request over another access request to access the recording medium, wherein the setting unit (i) sets the priority or the permission information for each access request that is directed to the recording medium, (ii) is independent of a priority setting function that is applicable to the application accessing resources other than the recording medium, such that the setting unit does not influence priority setting for the use, associated with execution of the application, of resources other than the recording medium, the resources other than the recording medium including random access memory, and (iii) is capable of setting the priority or the permission information for each of at least two access requests that are from respective applications and that request access to a common volume of the recording medium;

a queue controller that is operable in storing the access request provided with the priority or the permission information in a queue; and an access request processor that is operable in processing the access request stored in the queue in an order relative to other access requests stored in the queue according to the priority or the permission information, such that the access request is processed to access the storage medium prior to another of the other access requests stored in the queue prior to the storing of the access request.

4. An information processing apparatus for processing an access request to access a recording medium from an application, comprising:

setting means for setting a priority unique to the access request from the application or permission information indicating whether or not processing on the access request from the application is permitted, the priority and the permission information each being indicative of a preference for processing the access request over another access request to access the recording medium, wherein the setting means (i) sets the priority or the permission information for each access request that is directed to the recording medium, (ii) is independent of a priority setting function that is applicable to the application accessing resources other than the recording medium, such that the setting means does not influence priority setting for the use, associated with execution of the application, of resources other than the recording medium, the resources other than the recording medium including random access memory, and (iii) is capable of setting the priority or the permission information for each of at least two access requests that are from respective applications and that request access to a common volume of the recording medium;

queue control means for storing the access request provided with the priority or the permission information in a queue; and access request processing means for processing the access request stored in the queue in an order relative to other access requests stored in the queue according to the priority or the permission information, such that the access request is processed to access the storage medium prior to another of the other access requests stored in the queue prior to the storing of the access request.

5. The information processing apparatus according to claim 4, wherein the setting means sets a higher priority for an access request from a specific application than a priority for an access request from another application.

6. The information processing apparatus according to claim 5, wherein the access requests from the specific application and the another application are requests for access to a common volume of the recording medium.

7. The information processing apparatus according to claim 4, wherein the access request processing means constantly processes an access request from a specific application and processes an access request from another application only when the permission information indicates that the processing on the access request from the another application is permitted.

8. The information processing apparatus according to claim 4, further comprising: cache function setting means for setting whether or not a cache function is used, wherein the access request processing means processes the access request according to whether or not the cache function is used.

9. The information processing apparatus according to claim 8, wherein the access9 request processing means processes an access request from a specific application according to whether or not the cache function is used.

10. The information processing apparatus according to claim 4, wherein the information processing apparatus is a filter driver for filtering the access request and delivering the filtered access request to a file system driver.

11. The information processing apparatus according to claim 4, wherein data to be read or written from or into the recording medium includes at least audio-visual data.

12. The information processing apparatus according to claim 4, wherein, in the operation of recording areas of the recording medium, among consecutive free areas having at least a predetermined size, a free area located closest to a recording area on which data has just been recorded is reserved for recording subsequent data in the reserved free area.

13. The information processing apparatus according to claim 4, wherein the priority unique to the access request or the permission information is set based on stored data identifying the application.

14. The information processing apparatus according to claim 4, wherein the priority unique to the access request or the permission information is set based on stored data that identifies a process that is operative in generating the access request from the application.

15. The information processing apparatus according to claim 14, wherein the stored data identifying the process is stored upon the process being loaded for execution, and is deleted in response to the process being completed.

16. The information processing apparatus according to claim 4, wherein the setting of the priority unique to the access request or the permission information includes storing data that corresponds to and is distinct from the access request and that represents the priority of the access request.

17. The information processing apparatus according to claim 16, wherein the data that represents the priority of the access request represents a flag that indicates whether or not processing on the access request from the application is permitted.

18. The information processing apparatus according to claim 16, wherein the data that represents the priority of the access request comprises a plurality of bits having a numeric value that corresponds to a priority value.

19. The information processing apparatus according to claim 4, wherein the setting means is operable in setting the priority unique to the access request from the application and is neither operable nor configured for setting the permission information indicating whether or not processing on the access request from the application is permitted.

20. The information processing apparatus according to claim 1, wherein the setting means is operable in setting the permission information indicating whether or not processing on the access request from the application is permitted and is neither operable nor configured for setting the priority unique to the access request from the application.

21. An information processing method for processing an access request to access a recording medium from an application, the method comprising:

setting a priority unique to the access request from the application or permission information indicating whether or not processing on the access request from the application is permitted, the priority and the permission information each being indicative of a preference for processing the access request over another access request to access the recording medium, wherein the setting of the priority or the permission information (i) is performed for each access request that is directed to the recording medium, (ii) is independent of a priority setting function that is applicable to the application accessing resources other than the recording medium, such that the setting of the priority or permission information does not influence priority setting for the use, associated with execution of the application, of resources other than the recording medium, the resources other than the recording medium including random access memory, and (iii) is capable of being performed for each of at least two access requests that are from respective applications and that request access to a common volume of the recording medium;

storing the access request provided with the priority or the permission information in a queue; and processing the access request stored in the queue in an order relative to other access requests stored in the queue according to the priority or the permission information, such that the access request is processed to access the storage medium prior to another of the other access requests stored in the queue prior to the storing of the access request.

22. The information processing method according to claim 21, further comprising setting whether or not a cache function is used, wherein the access request is processed according to whether or not the cache function is used.

23. The information processing method according to claim 21, wherein data to be read or written from or into the recording medium includes at least audio-visual data.

24. The information processing method according to claim 21, wherein the priority unique to the access request or the permission information is set based on stored data identifying the application.

25. The information processing method according to claim 21, wherein the priority unique to the access request or the permission information is set based on stored data that identifies a process that is operative in generating the access request from the application.

26. The information processing method according to claim 25, wherein the stored data identifying the process is stored upon the process being loaded for execution, and is deleted in response to the process being completed.

27. The information processing method according to claim 21, wherein the setting of the priority unique to the access request or the permission information includes storing data that corresponds to and is distinct from the access request and that represents the priority of the access request.

28. The information processing method according to claim 27, wherein the data that represents the priority of the access request represents a flag that indicates whether or not processing on the access request from the application is permitted.

29. The information processing method according to claim 27, wherein the data that represents the priority of the access request comprises a plurality of bits having a numeric value that corresponds to a priority value.

\* \* \* \* \*

UNITED STATES PATENT AND TRADEMARK OFFICE
CERTIFICATE OF CORRECTION

PATENT NO.       : 7,647,455 B2
APPLICATION NO. : 11/105242
DATED            : January 12, 2010
INVENTOR(S)      : Shin Kimura It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 295 days.

Signed and Sealed this

Twenty-eighth Day of December, 2010

David J. Kappos
*Director of the United States Patent and Trademark Office*